United States Patent [19]

Ito et al.

[11] 4,052,727

[45] Oct. 4, 1977

[54] EXPOSURE CONTROL DEVICE FOR A SINGLE LENS REFLEX CAMERA

[75] Inventors: Tadashi Ito; Fumio Ito, both of Yokohama; Soichi Nakamoto, Machida; Yasuo Isobe, Kawasaki, all of Japan

[73] Assignee: Canon Kabushiki Kaisha, Tokyo, Japan

[21] Appl. No.: 527,016

[22] Filed: Nov. 25, 1974

Related U.S. Application Data

[63] Continuation of Ser. No. 455,536, March 28, 1974, abandoned.

[30] Foreign Application Priority Data

| Mar. 30, 1973 | Japan | 48-36287 |
|---|---|---|
| Apr. 28, 1973 | Japan | 48-48672 |
| May 14, 1973 | Japan | 48-53296 |
| May 17, 1973 | Japan | 48-54997 |
| May 17, 1973 | Japan | 48-54998 |
| May 17, 1973 | Japan | 48-54999 |
| May 22, 1973 | Japan | 48-57332 |

[51] Int. Cl.² ............................................. G03B 7/14
[52] U.S. Cl. .................................. 354/29; 354/38
[58] Field of Search ................. 354/26, 29, 30, 36, 354/38, 39

[56] References Cited

U.S. PATENT DOCUMENTS

| 3,416,421 | 12/1968 | Biedermann et al. | 354/39 |
|---|---|---|---|
| 3,466,447 | 9/1969 | Fahlenberg | 354/43 |
| 3,554,104 | 1/1971 | Winkler et al. | 354/38 X |
| 3,662,659 | 5/1972 | Metzger et al. | 354/29 |
| 3,672,753 | 6/1972 | Nobusawa | 354/43 |
| 3,829,867 | 8/1974 | Ono | 354/29 X |
| 3,909,833 | 9/1975 | Sorimachi et al. | 354/50 |

FOREIGN PATENT DOCUMENTS

| 4,018,175 | 8/1965 | Japan | 354/30 |

Primary Examiner—L. T. Hix
Assistant Examiner—J. A. LaBarre
Attorney, Agent, or Firm—Toren, McGeady and Stanger

[57] ABSTRACT

An exposure control device for a single lens reflex camera includes an adjustable shutter which is arranged to furnish a plurality of exposure times, and an adjustable electrical delay circuit which is operative to adjust the shutter to select the exposure time. An adjustable diaphragm device is also included which is arranged to furnish a plurality of aperture sizes and is mounted into a lens and which further includes means for receiving light from a photographing object through the diaphragm device and converting it into electrical signal. A diaphragm determining means is connected with the diaphragm device to select an aperture size, and which is connected to the receiving means and further includes means for detecting the adjustable aperture limit connected with the delay circuit to compensate the adjusted exposure time for proper exposure. A manually operated selector means is included for adjusting the diaphragm determining means to insert the adjusted time thereinto. Storage means is also included for memorizing the electrical signal of the receiving means connected with the delay means when shutter operation is effected.

7 Claims, 25 Drawing Figures

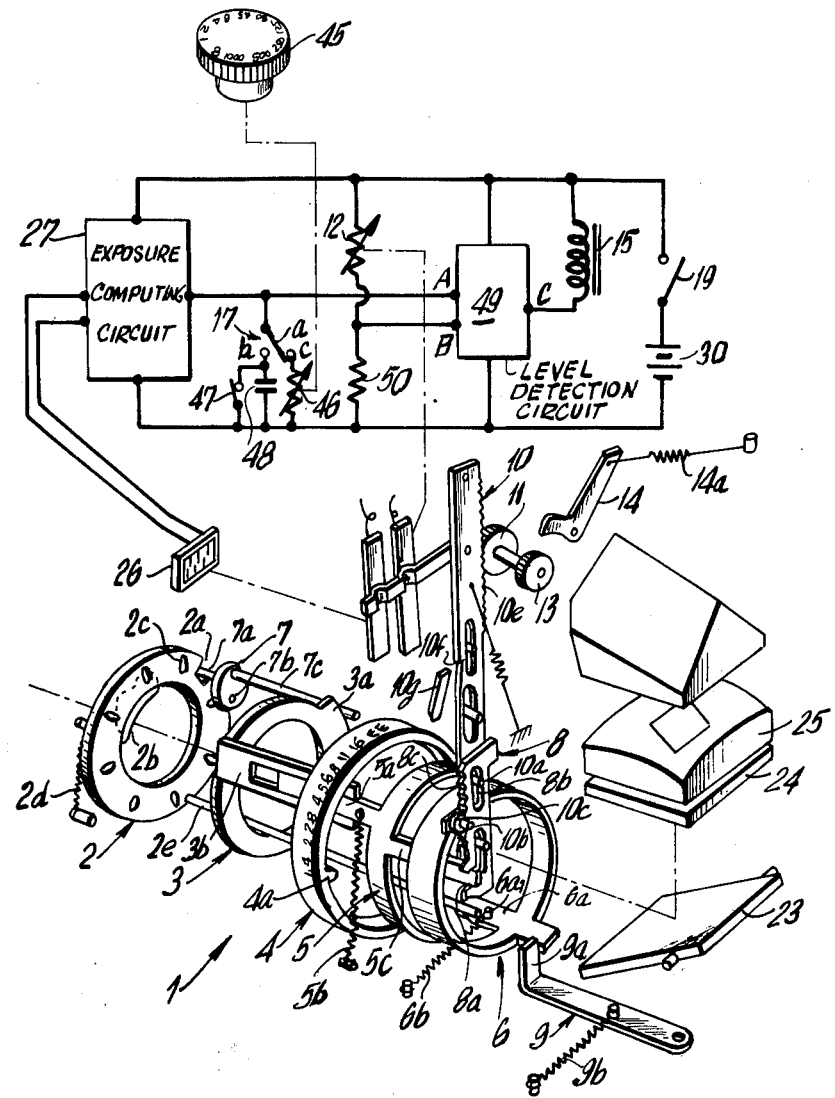
FIG. I

EXPOSURE CONTROL DEVICE FOR A SINGLE LENS REFLEX CAMERA

This is a continuation of application Ser. No. 455,536, filed Mar. 28, 1974, now abandoned.

The present invention relates to an exposure control device for a single lens reflex camera, particularly an exposure control device incorporated with a TTL light measuring device.

As the single lens reflex cameras now commonly used incorporate a photographing lens as a finder optical system for viewing an object to be photographed, they are free from problems of parallax errors and differences in the view field angle, etc. due to difference in focal length at the time of lens interchange, and thus, have an advantage of very easy handling.

For incorporation of a light measuring device in a single lens reflex camera, various proposals have been made for a single lens reflex camera incorporated with a so-called TTL light measuring device with a photoelectric cell such as CdS cells arranged in a finder optical system, and also various proposals have been made for a single lens reflex camera in which an electric memory device such as a condenser is used and the object light amount is memorized electrically. The shutter time is set according to the memorized value at the time of photographing so as to eliminate the defect caused by the cut-off of the object light to the photoelectric cell due to the rising of a reflex mirror.

For operation of a camera, the following two systems are generally known. (1) So-called shutter speed preference system in which the shutter speed is set preferentially, and a diaphragm aperture is set so as to give a proper exposure using the thus set shutter speed and the amount of object light to be measured. (2) So-called diaphragm preference system in which the diaphragm aperture diameter is set preferentially, and a shutter speed is set so as to give a proper exposure on the basis of the thus set diaphragm value and the measured amount of object light. According to the system (1) as disclosed in Japanese Patent Publications Nos. Sho 41-8609, Sho 41-17180 and Sho 41-18461 the diaphragm aperture is obtained from the preset shutter speed informations and the object light informations given by the light measuring element by controlling the diaphragm aperture electromagnetically or by means of a servo-motor.

According to the system (2), as disclosed in U.S. Pat. No. 3,324,779, the amount of object light is measured after the diaphragm value has been set preferentially, and is memorized in a condenser, and the shutter speed is adjusted on the basis of the memorized value and the preset diaphragm value at the time of photographing.

One of the objects of the present invention is to provide an exposure control device for a single lens reflex camera, which can be operated selectively for both of the above systems (1) and (2) and yet can give a proper exposure value on the basis of the amount of object light obtained by a TTL light measuring system.

Another object of the present invention is to provide an exposure control device for a single lens reflex camera, which sets the preset shutter automatically if a proper exposure can not be obtained. This occurs even if the diaphragm aperture value reaches its limit value when the diaphragm aperture diameter is adjusted from the preferentially preset shutter speed on the basis on the amount of object light given by a TTL light measuring system.

Still another object of the present invention is to provide an exposure control device for a single lens reflex camera which can attain the above objects by measuring the amount of light of an object according to a TTL full-open diaphragm light measuring system.

Further, still another object of the present invention is to provide an exposure control device which can attain the above objects by using a very simple control circuit using a single control circuit sequentially both for diaphragm value adjustment and shutter time correction.

Other objects of the present invention will be clear from the following descriptions and examples.

The present invention will be described in details referring to the attached drawings.

FIG. 1 is a general view of one example of the present invention.

FIG. 5 – FIG. 8 relate to a second embodiment of the present invention.

Figure 5:
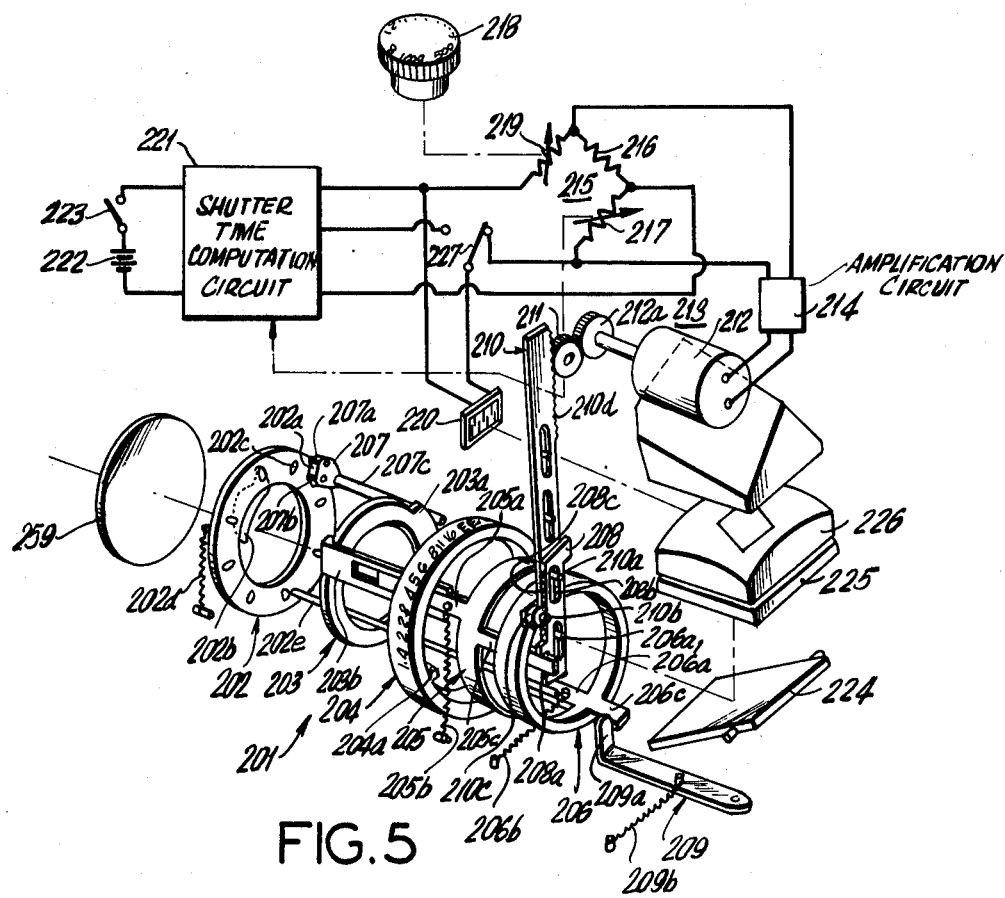

FIG. 5 is a general view of the embodiment.

Figure 6:
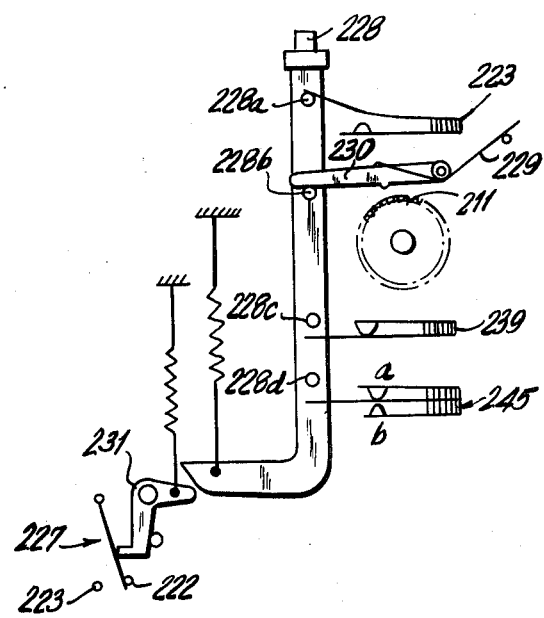

FIG. 6 shows the relation between the switches and the shutter button shown in FIG. 5.

Figure 7:
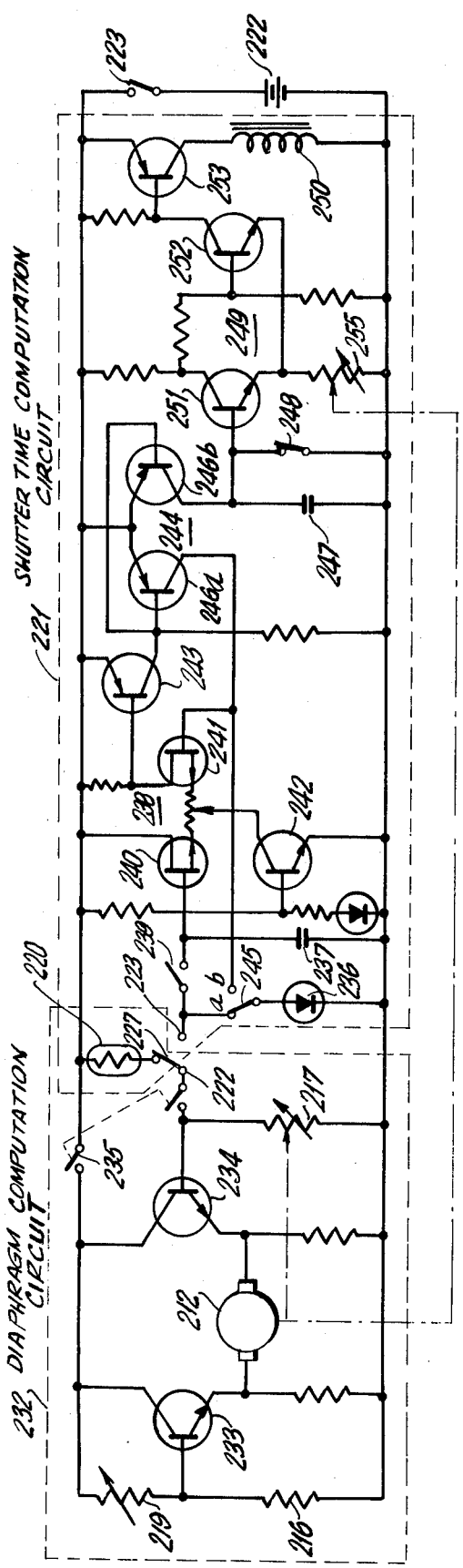

FIG. 7 is a schematic view of the exposure control circuit shown in FIG. 5.

Figure 8:
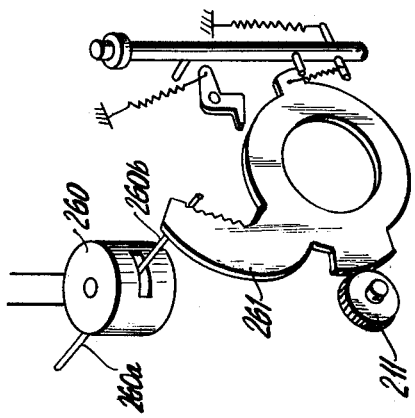

FIG. 8 is a structural view of a meter used in place of the servo-motor shown in FIGS. 5 and 7.

Figure 9:
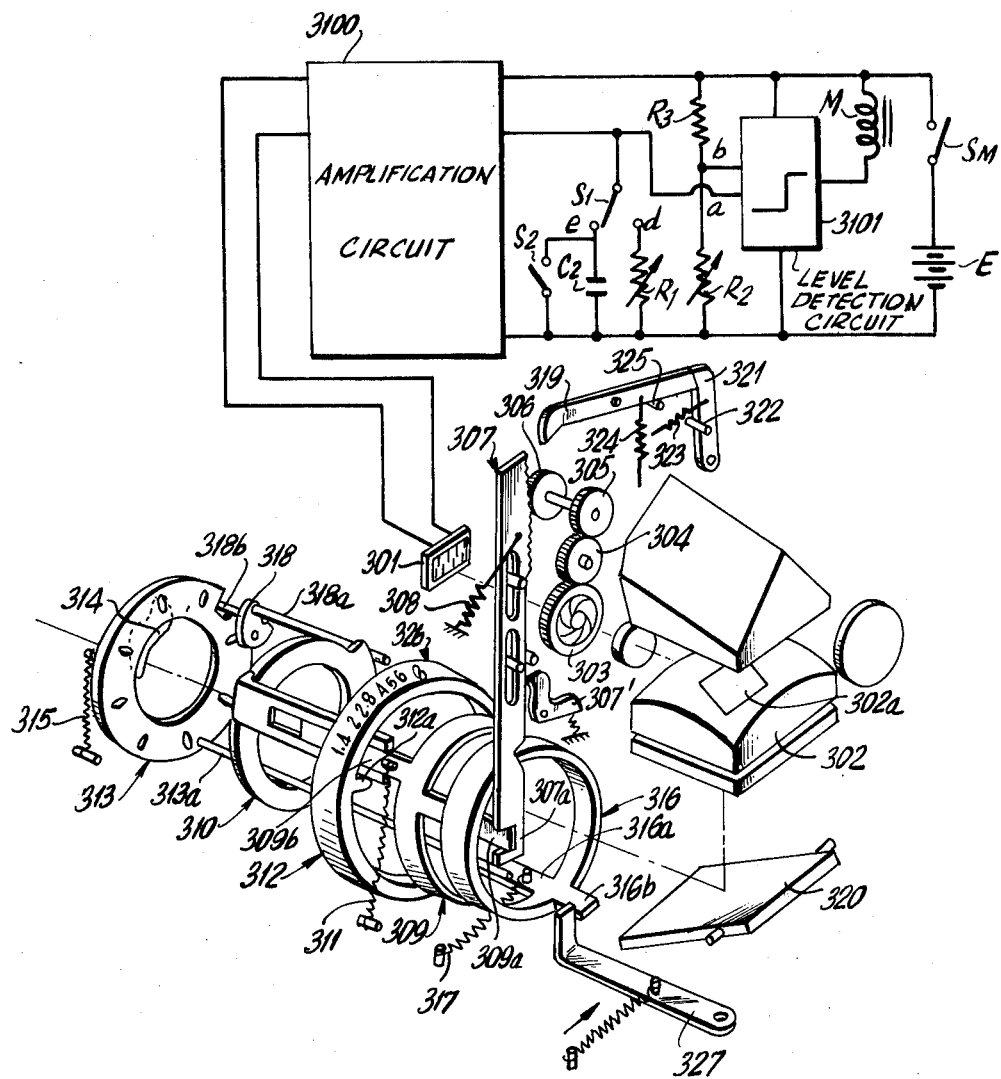
Figure 10:
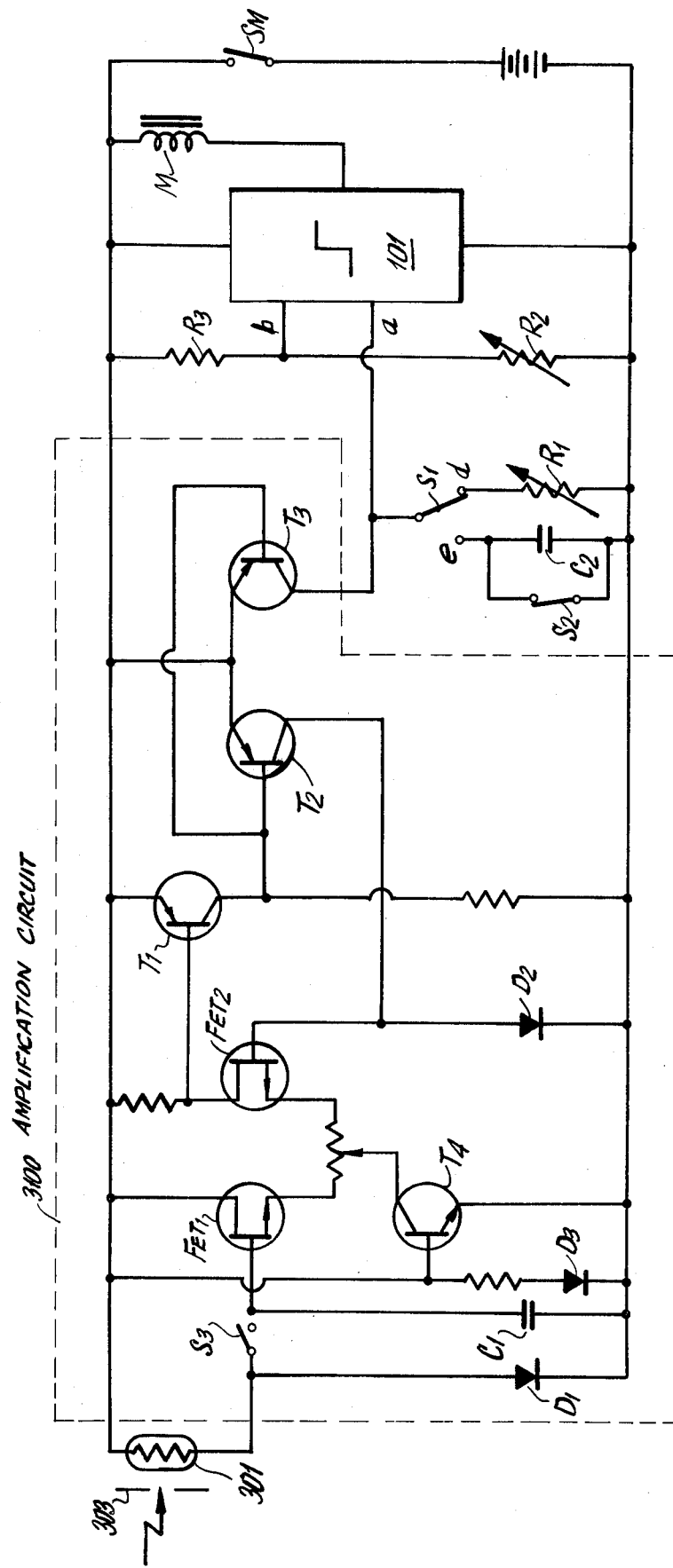

FIG. 9 – FIG. 10 relate to a third embodiment of the present invention.

FIG. 9 is a slant view of the embodiment.

FIG. 10 shows a circuit used for the embodiment.

FIG. 11 – FIG. 14 relate to a fourth embodiment of the present invention.

Figure 11:
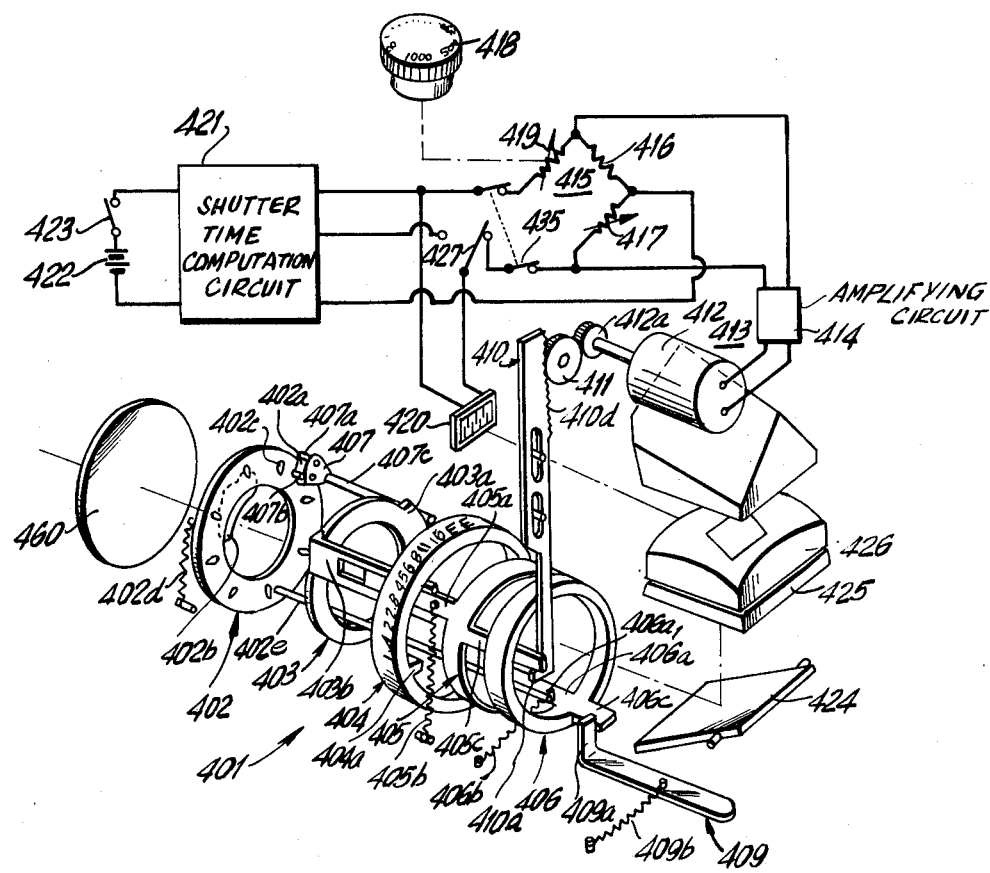

FIG. 11 is a general view of the embodiment.

Figure 12:
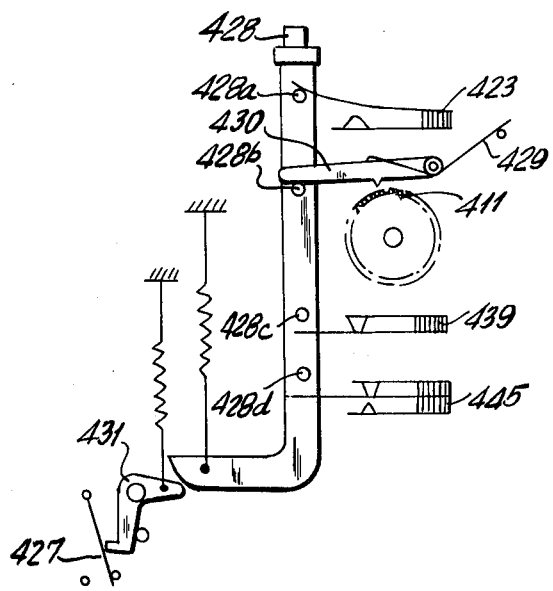

FIG. 12 shows the relation between the switches and the shutter button shown in FIG. 11.

Figure 13:
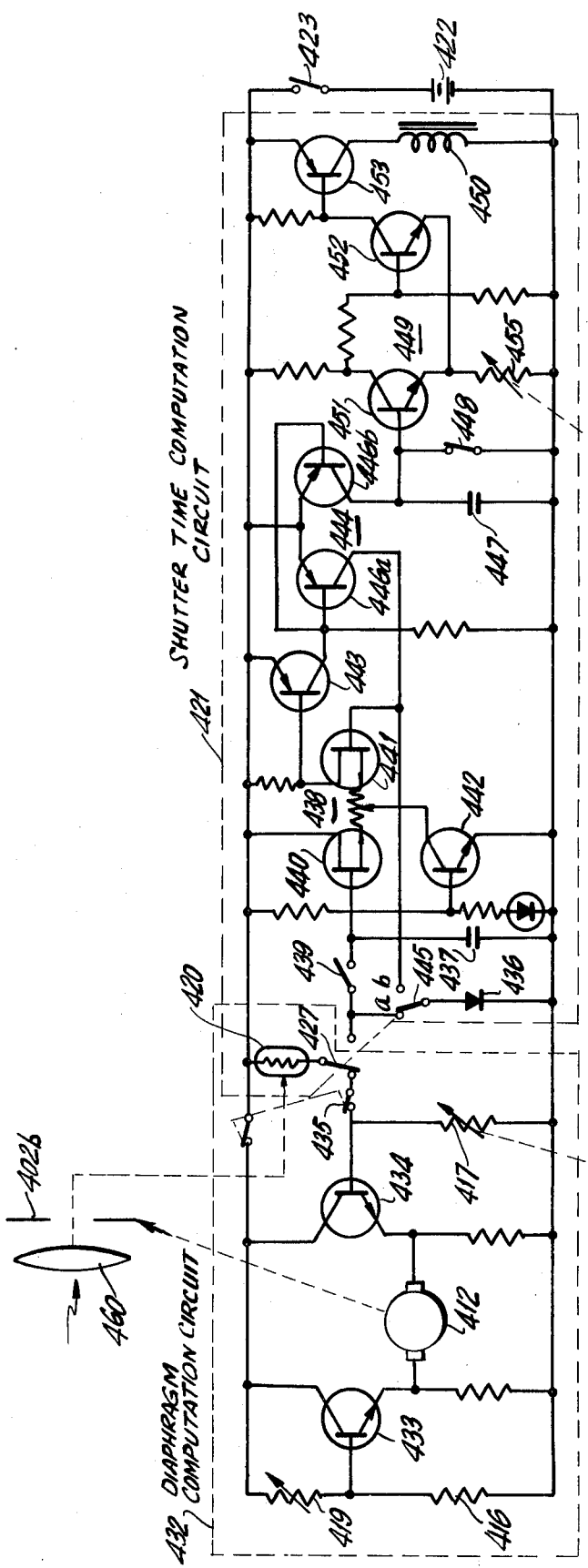

FIG. 13 is a schematic view of the exposure control circuit shown in FIG. 12.

Figure 14B:
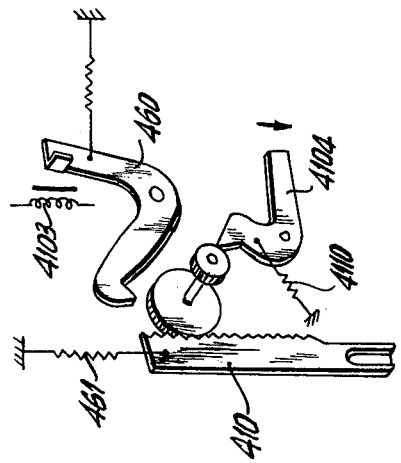
Figure 14A:
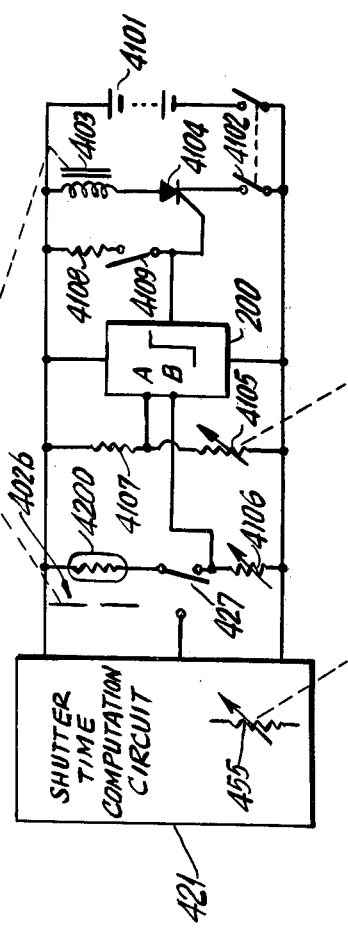

FIG. 14(a) show an exposure control circuit in case when a null detecting circuit is used in place of the servo-motor shown in FIG. 13.

FIG. 14(b) shows the moving portion of the slide plate shown in FIG. 14(a).

Figure 15:
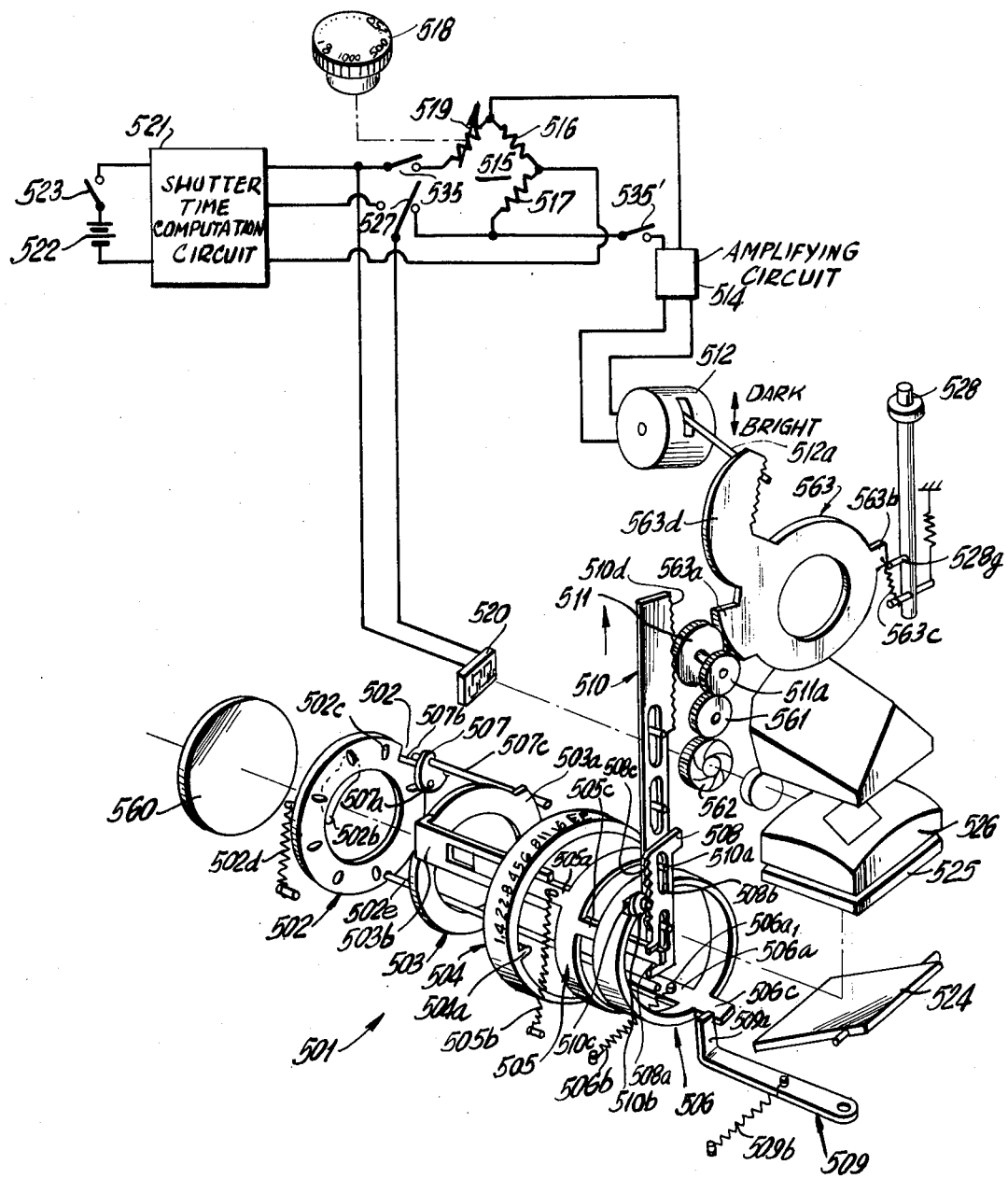
Figure 16:
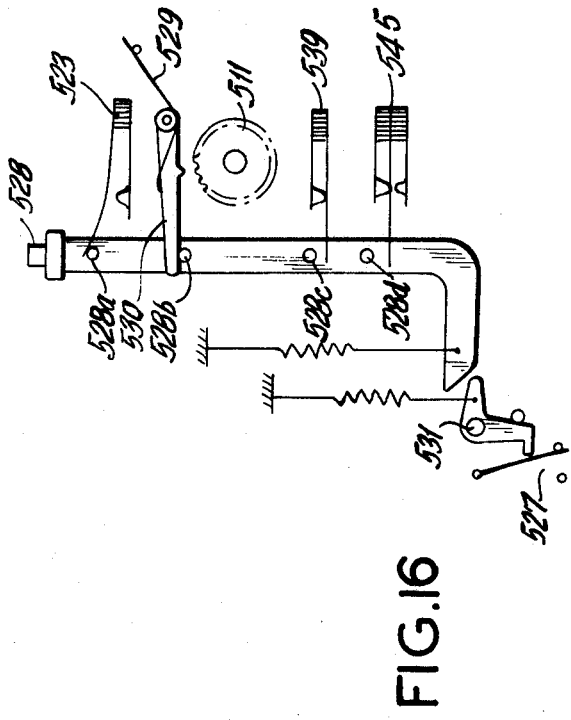
Figure 17:
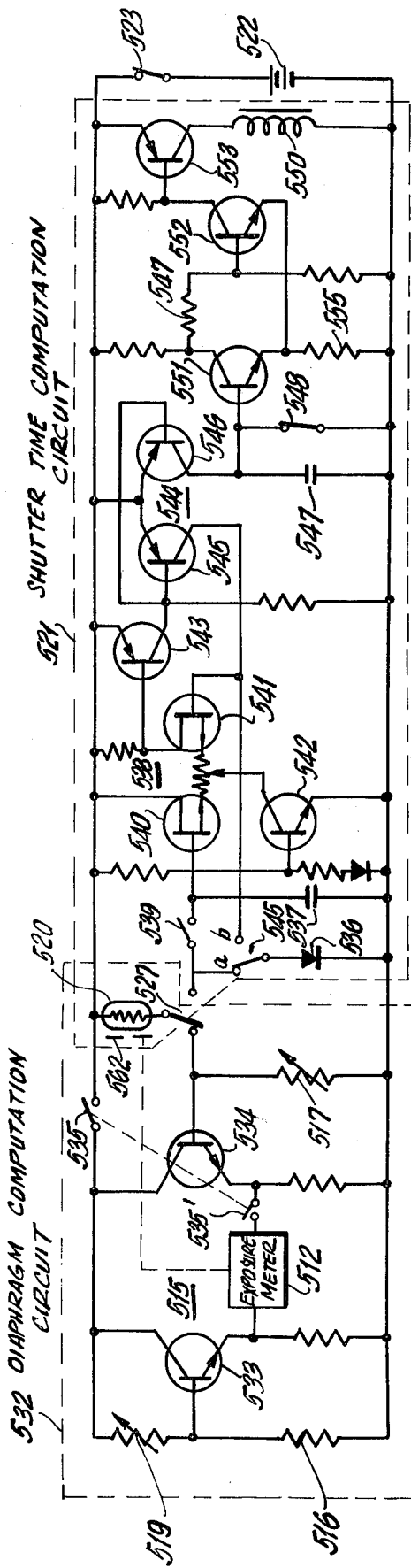

FIG. 15 – FIG. 17 relate to a fifth embodiment of the present invention.

FIG. 15 is a general view of the embodiment.

FIG. 16 shows the relation between the switches and the shutter button shown in FIG. 15.

FIG. 17 is a schematic view of the exposure control circuit shown in FIG. 15.

Figure 18:
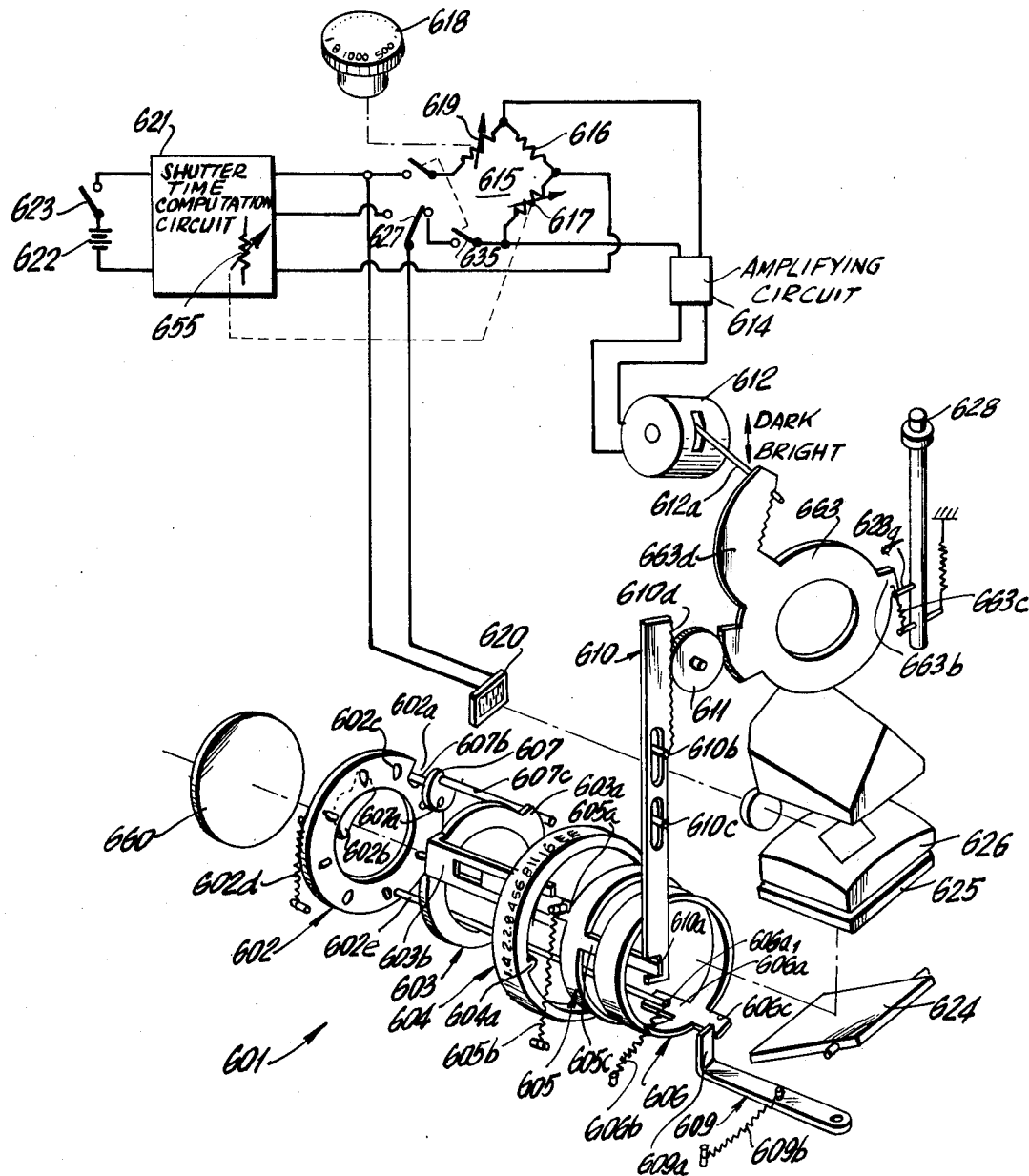
Figure 19:
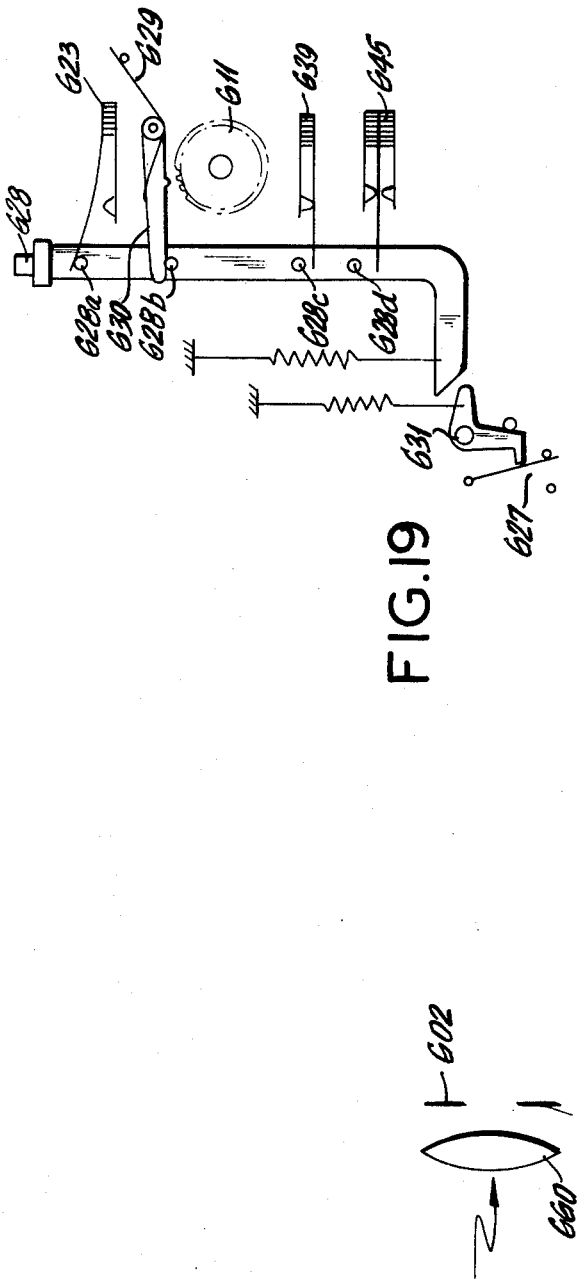
Figure 20:
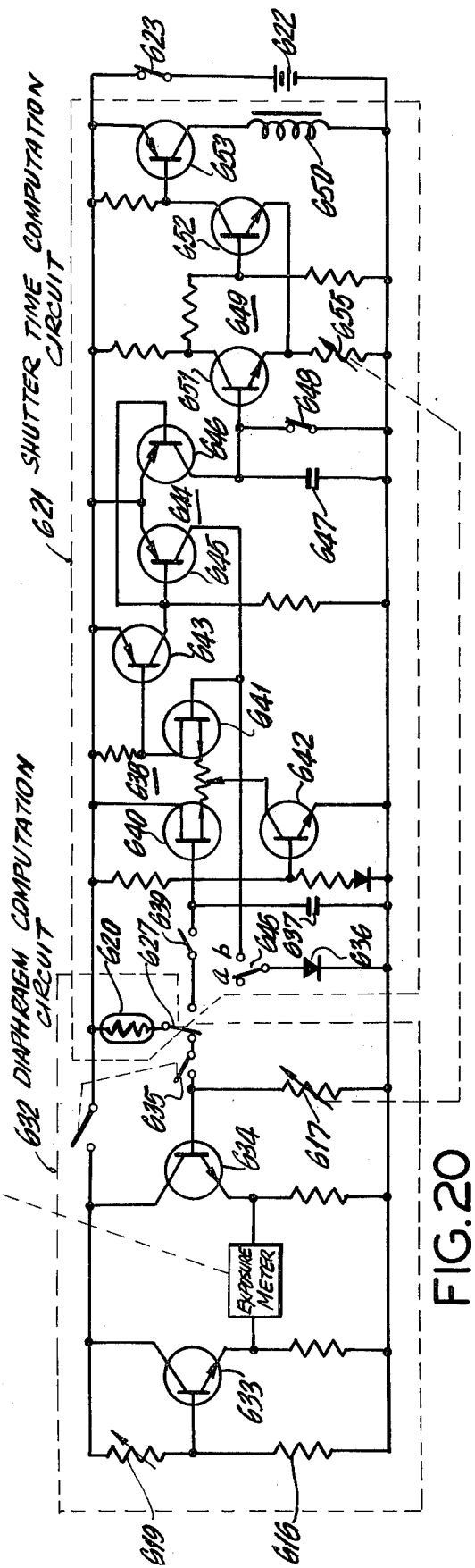

FIG. 18 – FIG. 20 relate to a sixth embodiment of the present invention.

FIG. 18 is a general view of the embodiment.

FIG. 19 shows the relation between the switches and the shutter button shown in FIG. 18.

FIG. 20 is a schematic view of the exposure control circuit shown in FIG. 18.

FIG. 21 – FIG. 24 relate to a seventh embodiment of the present invention.

Figure 21:
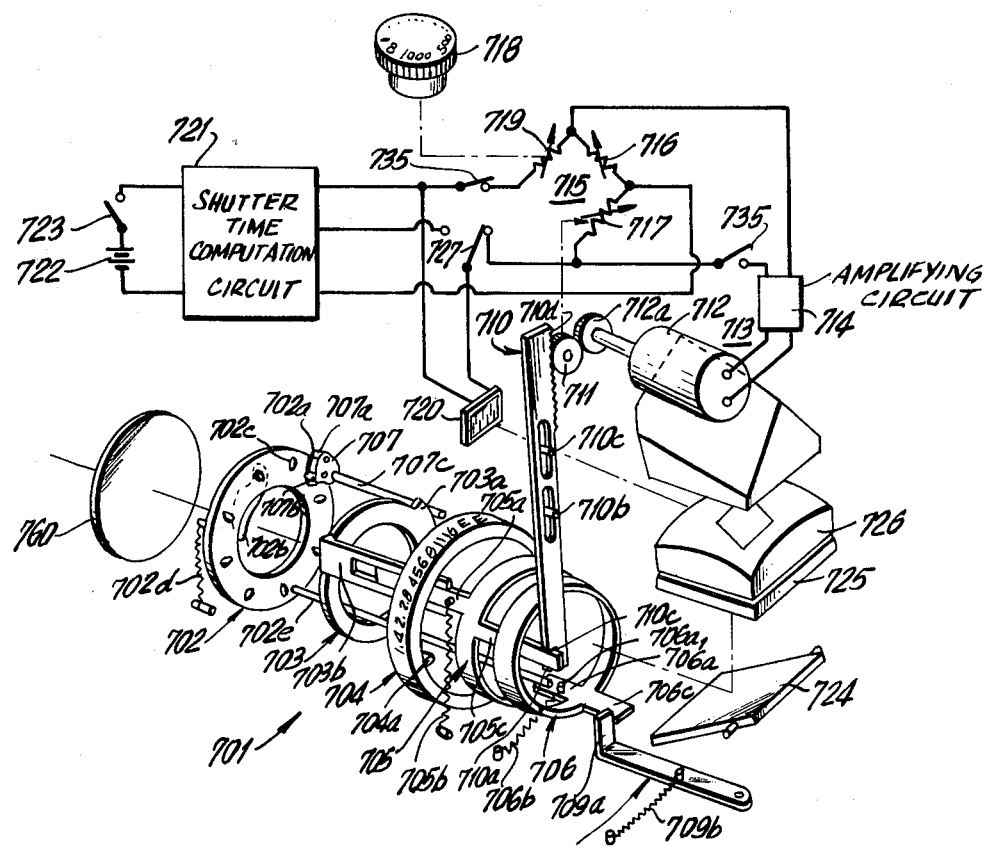

FIG. 21 is a general view of the embodiment.

Figure 22:
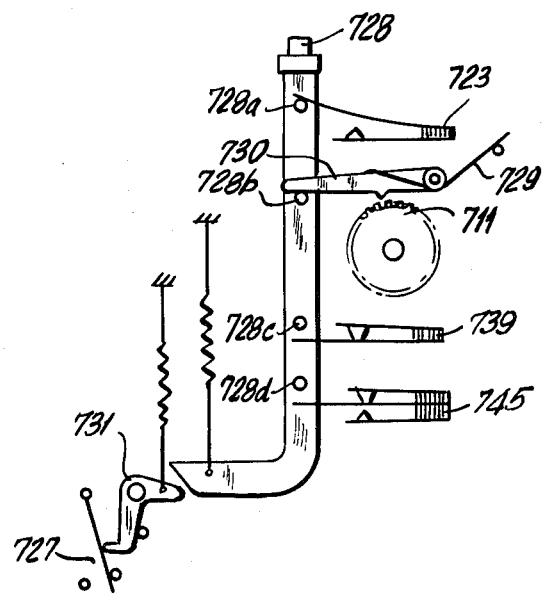

FIG. 22 shows the relation between the switches and the shutter button shown in FIG. 21.

Figures 23, 24:
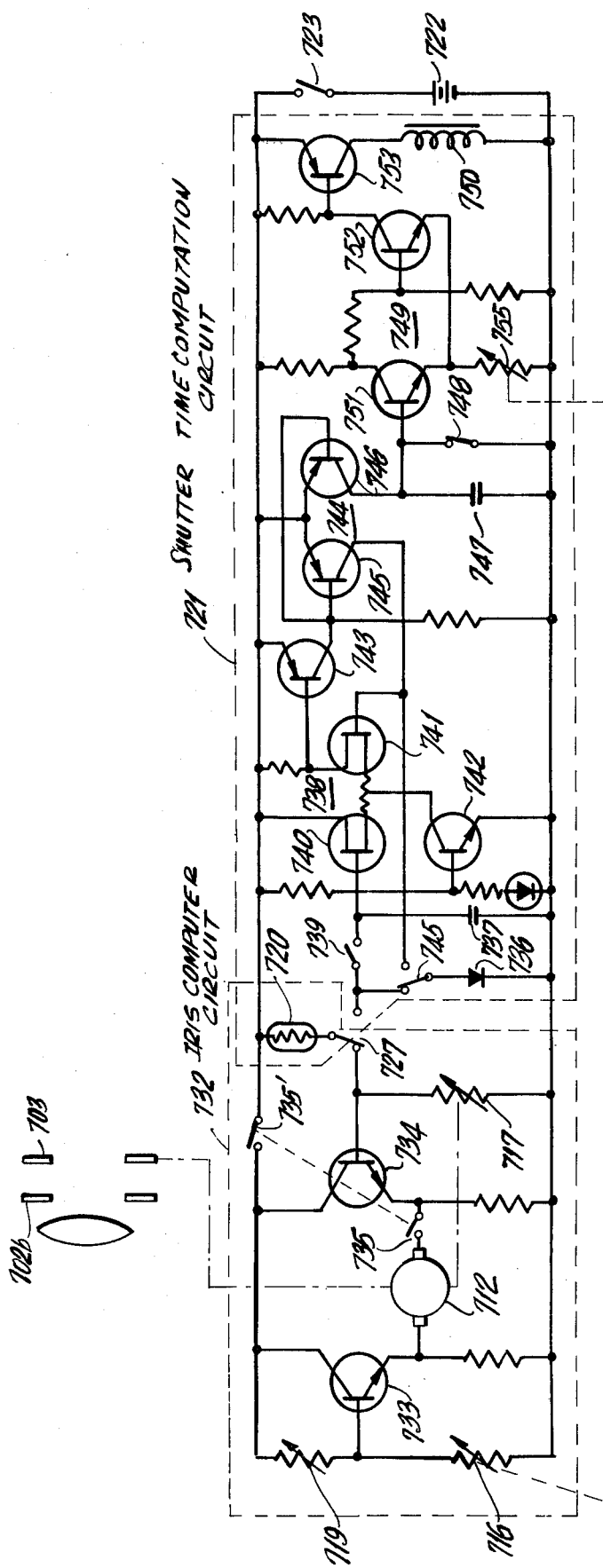

FIG. 23 is a schematic view of the exposure control circuit shown in FIG. 21.

FIG. 24 is a structural view of a meter used in place of the servo-moter shown in FIG. 21 and FIG. 23.

Now a first embodiment of the present invention will be explained referring to FIG. 1 to FIG. 4.

Figure 2:
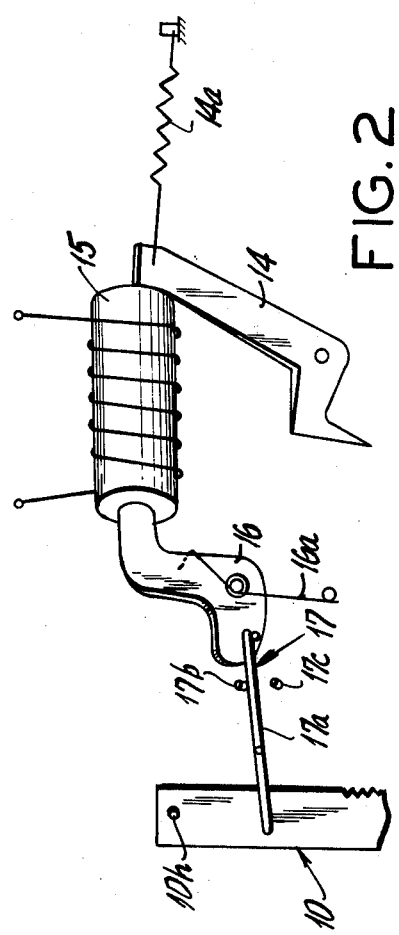
FIG. 2 shows the relation between the magnet and the switch in FIG. 1.

FIG. 1 shows the entire device, wherein 1 is a diaphragm mechanism which consists of a diaphragm ring 2, a diaphragm aperture setting cam ring 3, a manually operated diaphragm ring 4, a diaphragm aperture setting ring 5, a diaphragm driving ring 6, etc. being positioned in said order behind a photographing lens which is not shown in the drawing. This diaphragm mechanism 1 is made as follows: That is, the diaphragm ring 2 has a notched part 2a for positioning a bell crank 7 which is to be described later and holes 2c into which a diaphragm 2b of such nature as always fully opened is inserted are provided, and the diaphragm ring 2 is biased to rotate in a counterclockwise direction by a spring 2d, so that as the diaphragm ring 2 is rotated in a counterclockwise direction the above mentioned diaphragm 2b is stopped down. The biasing power of this diaphragm ring 2 is preserved by having a connecting rod 2e planted on said diaphragm ring 2 which is checked by a pin 6a₁ on a protruding part 6a of the diaphragm driving ring 6. A cam plane part 3a and an arm part 3b are provided at the circumference of the diaphragm aperture setting ring 3, and this cam plane part 3a contacts with a planting lever 7c of the bell crank 7 being positioned in the notched part 2a of the diaphragm ring 2. This bell crank 7 is rotated around a rotating axle 7a corresponding to the stroke of the cam plane part 3a to determine the position of the pin 7b and is to control the stop down rotation of the above mentioned diaphragm ring 2 by said position of the pin 7b. Also an arm part 3b of the diaphragm aperture setting cam ring 3 is engaged with an arm part 5a of the diaphragm aperture setting ring 5, wherein the engagement relationship is such that the diaphragm aperture setting cam ring 3 is not slided by the moved of the diaphragm aperture setting ring 5 in a to and fro direction, instead the diaphragm aperture setting cam ring 3 is rotated by the rotation of the diaphragm aperture setting ring 5. In the manually operated diaphragm ring 4, its projection part 4a is engaged with an arm part 3b of the above mentioned diaphragm aperture setting cam ring 3 so that when the letters EE punched at the circumference of said manually operated diaphragm ring 4 is matched with the indication mark on a specular bronze (which is not shown in the drawing) that is, in the state shown in this drawing, control of the amount of light can be made automatically. Further by having each diaphragm aperture figure matched with the above mentioned indication mark setting of any desired diaphragm aperture can be made, and the diaphragm aperture setting ring 5 is biased to rotate in a counterclockwise direction by a spring 5b and at the same time another arm part 5c is provided at an opposite end of the above mentioned arm part 5a. The other arm part 5c is engaged with a concave part 8a of a preset lever 8. The diaphragm driving ring 6 is biased to rotate in a clockwise direction by a spring 6b and at the same time has an arm part 6c. This arm part 6c is engaged with a riser part 9a of a stop-down lever 9, and while the stop-down lever 9 is biased to rotate in a counterclockwise direction by a spring 9b, it is to be rotated in a clockwise direction through a stop down lever driving mechanism (which is not shown in the drawing) just before the second step action of a shutter button 18 of a camera. The above mentioned preset lever 8 has a guide hole 8b and a saw-teeth shape part 8c provided thereon and a guide pin 10a of a sliding plate 10 is inserted into said guide hole 8b. A claw 10c, which is rotatably installed on said sliding plate 10 by a pin 10b, is engaged with the saw-teeth shape part 8c of the preset lever 8, so that the relative position of the sliding plate 10 and the preset lever 8 can be changed according to the sensitivity of film. Normally the sliding plate 10 and the preset lever 8 are made to be shifted integrally. The sliding plate 10 has a spring 10d which biases said plate 10 in a downward direction, and also has a rack 10e which is engaged with a gear 11 being linked with a wind up system which is not shown in the drawing, wherein as the wind-up system is actuated, the sliding plate 10 is shifted upward against the force of the spring 10d and is charged and the state thus charged is retained as a claw 10g is engaged with a notched part 10f. This claw 10g is made to having its engagement released when a movable contacting piece 22a of a switch 22 which is to be described later is changed over to a fixed contact 22b. Also a sliding piece of a variable resistor 12, which has its resistance value changed as the sliding plate 10 is shifted, is installed to the sliding plate 10. A gear 13 is coupled with said gear 11 in a coaxial and integral manner and the gear 13 is locked as it is engaged with a lever 14 for stopping the shifting of the sliding plate 10. This lever 14 is biased to rotate in a clockwise direction by a spring 14a and is to be rotated in a counterclockwise direction against the force of the spring 14a as a magnet 15 is excited so that it is engaged with the gear 13. The magnet 15 is, as shown in FIG. 2, to change over the contact of a switch 17 through a lever 16 by its own excitation and non-excitation. That is, as the magnet 15 is excited the lever 16 is attracted and the movable contacting piece 17a of the switch 17 is changed over to the fixed contact 17b, while the lever 16 is rotated in a counterclockwise direction by the spring 16a as the magnet 15 becomes non-excited to have the movable contacting piece 17a changed over to the fixed contact 17c. Also the magnet 15 is to conduct checking of a shutter rear screen in the state of excitation. And the other end of the movable contacting piece 17a is extended and is positioned at around the upper end of the sliding plate 10 and as the sliding plate 10 is slided downward to its end point, the movable contacting piece 17a is pressed by a projection part 10b provided at upper part of the sliding plate 10 by the reason to be described below and is changed over to the fixed contact 17b.

Figure 3:
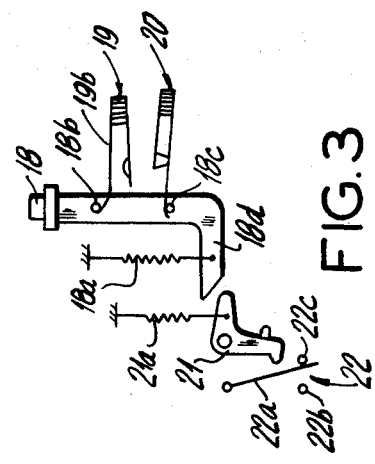
FIG. 3 shows the relation between the switches and the shutter button.

FIG. 3 shows the state in which each of the switches which are in linked relationship with a shutter button is positioned, wherein the axle of the shutter button 18 is biased in an upward direction by a spring 18a and at the same time pins 18b, 18c are provided at said axle, and the movable contacting pieces 19a, 20a of the switches 19, 20 are engaged with said pins 18b, 18c. Also an arm 18d at a forward end of the axle of the shutter button 18 can rotate a lever 21, which is biased to rotate in a counterclockwise direction by a spring 21a, in a clockwise direction, and a movable contacting piece 22a of a switch 22 is engaged with said lever 21. As the shutter button 18 is pressed, first the switch 19 becomes ON then the switch 20 becomes OFF and after that the movable contacting piece 22a of the switch 20 is changed over from the fixed contact 22c to the contact 22b. At the time of this change over, the engagement of a claw (which is not shown in the drawing) but is to retain the charge of the above mentioned sliding plate 10 is released. As the shutter button 18 is further pressed down after a stop down lever driving mechanism which is not shown in the drawing is activated, the shutter front screen is made to move.

The light penetrating through the diaphragm 2b normally fully opened, goes through a reflective mirror 23, Fresnel lens 24, and a condensor lens 25 having a half mirror in that order and then is incident into a photo-conductive element 26.

Figure 4:
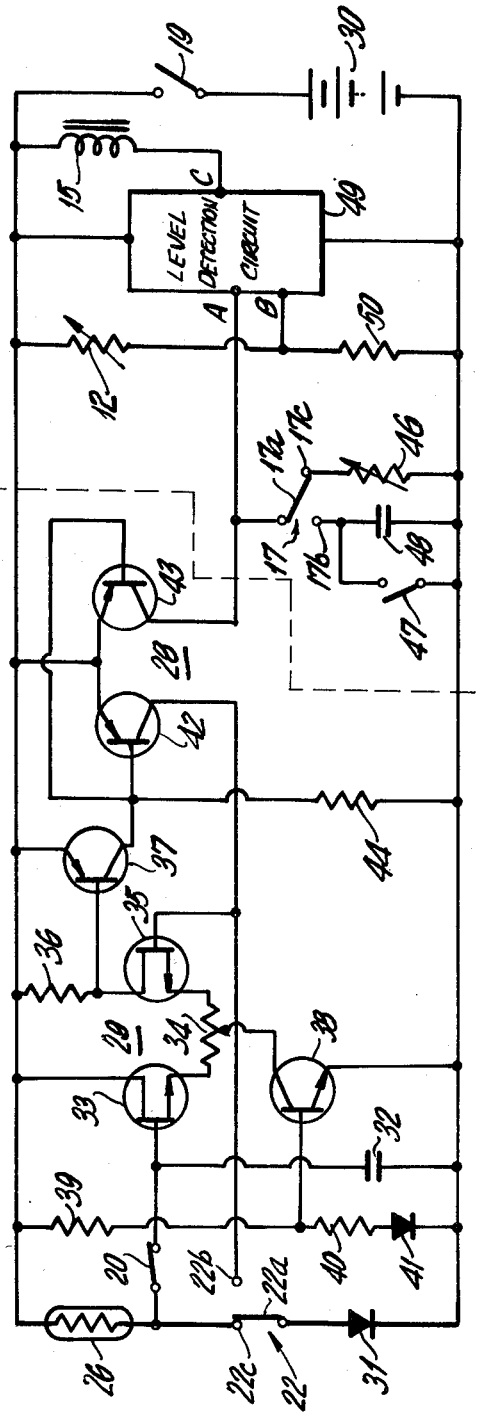
FIG. 4 is a schematic view of the exposure control circuit shown in FIG. 1.

FIG. 4 shows a specific exposure control circuit which was generally shown in FIG. 1, wherein the same components as those shown in FIG. 1, FIG. 2 and FIG. 3 will be identified with the same numbers and/or marks. 30 is a direct current power source and the positive terminal of said direct current power source is connected to the fixed contact 22c of the above mentioned switch 22 after going in series through the above mentioned main switch 19 and the photoconductive element 26. The movable contacting piece 22a of said switch 22 is connected to the negative terminal side of the direct current power source 30 through a log-diode 31. The connecting point between the above mentioned photo-conductive element 26 and the switch 22 is connected to a cathode of the log-diode 31 through the switch 20 and a memory condensor 32, also said connecting point is connected to the gate of a first field-effect transistor 33 through the switch 20. The source of this first field-effect transistor 33 is connected to the connecting point (hereinafter called as positive potential side) between the above mentioned main switch 19 and the photo-conductive element 26, while the drain of the same is connected to the drain of a second field-effect transistor 35 through a third variable resistor 34. A memory circuit 29 is composed of said first and second field-effect transistors 33, 35, and said memory circuit 29 is to retain the voltage memorized by the above mentioned memory condensor 32. The source of the second field-effect transistor 35 is connected to the positive potential side through the resistance 36 and at the same time is connected to the base of the first transistor 37 for inverting phase. The sliding piece of the above mentioned third variable resistance 34 is connected to the collector of the second transistor 38. The emitter of said second transistor is connected to the negative terminal side of the direct current power source, and the base of this second transistor 38 is connected to the connecting point of the resistances 39 and 40. A series circuit which consists of said resistances 39 and 40 and a diode 41 of such polarity as shown in the drawing is connected between the positive electric potential side and the negative terminal of the direct current power source 30. The emitter of the above mentioned first transistor 37 is connected to the positive potential side while the collector of the first transistor 37 is connected to the bases of third and fourth transistors 42, 43 and is also connected to the negative terminal side of the direct current power source 30 through the resistance 44. The third and fourth transistors 42, 43 consist of a regenerative circuit 28 and the emitters of this third and fourth transistors 42, 43 are connected to the positive electric potential side respectively. The collector of this third transistor 42 and the gate of the above mentioned second field-effect transistor 35 are connected to the fixed contact 22b of the above mentioned switch 22, and these parts together with a photo-conductive element 26, a log-diode 31, a condensor 32, a memory circuit 29, a regenerative circuit 28, etc. consist of an exposure computing circuit 27. Also the collector of the fourth transistor 43 is connected to the movable contacting piece 17a of a switch 17, and the fixed contact 17c of said switch 17 is connected to the negative terminal side of the direct current power source 30 through a first variable resistor 46 which has its resistance value changed by adjusting of a dial 45 having scale of exposure time. Also the fixed contact 17b of the switch 17 is connected to the negative terminal side of the direct current power source 30 through a capacitor 48 for determining exposure time which has the switch 47 being linked with starting of a shutter front screen running connected thereto in parallel. And the connecting part between the switch 17 and the collector of the fourth transistor 43 is connected to a terminal A for input for a level detection circuit 49 which is connected between the positive electric potential side and the negative terminal side of the direct current power source 30. Further the positive electric potential side is connected to the negative terminal side of the direct current power source 30 in series through the above mentioned second variable resistance 12 and the resistance 50, and the connecting point between said second variable resistance 12 and the resistance 50 is connected to a terminal B for input for the level detection circuit 49. A terminal C for output for said level detection circuit 49 is connected to the positive electric potential side through the magnet 15. This level detection circuit 49 becomes ON to excite the magnet 15 when the level at the terminal B becomes larger than the level at the terminal A that is the relation when A $\leq$ B is satisfied.

Next, the function of the above mentioned arrangement will be explained. In the beginning the state of each switch will be as shown in FIG. 3. First, the relative position between the sliding plate 10 and the preset lever 8 is changed according to the ASA sensitivity of film. And the letters EE on the manually operated ring 4 is matched with the indication mark of the lens specular bronze which is not shown in the drawing and the shutter dial 45 is set as desired, then the camera is pointed toward an object. Then the light which penetrated through the normally opened diaphragm 2b of the photographing lens will be incident upon the photo electric element 26. Now as the shutter button 18 is pushed, first the switch 19 becomes ON by the pin 18b. By this such voltage $E_1$ corresponding to the resistance value of the photo-conductive element 26 is generated between the terminals of the log-diode 31 by the current $I_1$ which goes through the photo-conductive element 26, the fixed contact 22c of the switch 22, the movable contact 22a of the switch 22, and the log-diode 31. The memory condensor 32 is charged by this voltage $E_1$, generating voltage $E_1$ between its terminals. This voltage $E_1$ is logarithmically proportional to the resistance value of the photo-conductive element, that is, the amount of light received.

Next, the switch 20 becomes OFF by the pin 18c and the terminal voltage $E_1$ of the condensor 32 is memorized and retained, and after that the movable contact 22a of the switch 22 is changed over to the fixed contact side 22b. Because of this, the log-diode 31 is connected to the gate of the second field-effect transistor 33 of the memory circuit 29 and current $I_2$ flows to the log-diode 31. This current $I_2$ is made to become equal to the current $I_1$ which flows to the log-diode 31 at the time of photo-sensing by the action of the first transistor 37 for phase inversion and of the third transistor 42 of the regenerative circuit 28. By this the terminal voltage $E_2$ of the log-diode 31 becomes $E_2 = E_1$, thus it becomes equal to the voltage $E_1$ between both terminals of the memory condensor 31. When such state is reached, the current $I_2$ between the emitter and the collector of the third transistor 42 of the regenerative circuit 28 becomes equal to the current $I_1$ which flows through the photo-conductive element 26 at the time of photo-sensing. That is the resistance value between the emitter and the collector of the third transistor 42 becomes equal to the resistance of the photo-conductive element 26 at the time of photo-sensing. The terminal A level which is determined by the resistance between the emitter and the collector of the fourth transistor 43 which has been set to provide the same function as that of said third transistor 42 and the resistance value of the first variable resistance 46 which is linked with the set exposure time, and the terminal B level, which is determined by the resistance value of the second variable resistor 12 which is linked with the sliding plate and the resistance value of the resistor 50, will be added at the level detection circuit, respectively. But as the claw 10g for checking the sliding plate 10 is released at the same time that the movable contacting piece 22a of the above mentioned switch 21 is changed over to the fixed contact 22b side, the sliding plate 10 is shifted downward by biasing power of the spring 10d, varying the sliding piece of the second variable resistor 12, and at the same time by the downward shifting of the sliding plate 10, the checking of the diaphragm setting ring 5 is released and the ring 5 is rotated in a counterclockwise direction by the biasing force of the spring 5b to rotate the diaphragm setting ring 3 in a counterclockwise direction. By this, the stroke of the cam plane part 3a is changed and the lever 7a makes follower movement, therefore the bell crank 7 is rotated to shift the position of the pin 7b. And as the sliding piece of the second variable resistor 12 varies, the terminal B level varies and becomes equal to the terminal A level. When they become equal to each other, the level detection circuit 49 becomes ON to excite the magnet 15. Because of this the magnet 15 attracts the lever 14, the lever 14 is rotated and is checked by a ratchet wheel 13 to lock the sliding plate 10. As the shifting of the sliding plate 10 is stopped by this, the position of the pin 7b of the bell crank 7 is set. That is, diaphragm aperture value is determined. Further, as the shutter button 18 is pressed down, the stop down lever 9 is rotated in a counterclockwise direction by the driving with a stop down lever which is not shown in the drawing to rotate the diaphragm driving ring 6 in a counterclockwise direction. As this rotation of the diaphragm driving ring 6 makes evacuation of the pin 6a, the counterclockwise rotation of the diaphragm ring 6 by the spring 2d through the connecting rod 2e is allowed, and the rotation is stopped as the notched part 2a comes in contact with the pin 7b, and at the same time stop down of the diaphragm 2b is done. Also the above mentioned magnet 15 changes over the movable contacting piece 17a of the switch 17 to the fixed contact 17b to prepare for starting the counting of exposure time. And when the shutter front screen runs following the action of the stop down lever 9, the switch 47 becomes OFF, therefore the shutter control condensor 48 is charged through the resistance between the emitter and the collector of the above mentioned transistor 43. And after such predetermined time that the charged voltage of the condensor 48 reaches a prescribed level, the level detection circuit 49 becomes OFF and the magnet 15 becomes ON. Because of this the checking of the shutter rear screen is released and pre-set exposure time is obtained, thus appropriate exposure is obtained. And as the magnet 15 becomes OFF, the movable contacting piece 17a of the switch 17 is changed over to the fixed contact 17c. And as the pressing of the shutter button 18 is released, the movable contacting piece 22a of the switch 22 is changed over to the fixed contact 22c side, and the switch 20 becomes ON while the switch 19 becomes OFF. And after completion of running of the shutter rear screen the stop down lever 9 returns to the state shown in the drawing to place the diaphragm 2b in a fully released state. And as a wind up axle which is not shown in the drawing is wound up the sliding plate 10 is charged and is retained by the claw 10g to return the bell crank 7 to its original position, and at the same time shutter charging and the film wind up are done thus resuming the original state.

While in the above case the diaphragm aperture is determined with shutter preference in an ordinary object brightness, when the shutter is activated the exposure time is determined by a predetermined diaphragm aperture. Therefore, when the level detection circuit 49 does not satisfy the relation $A \leqq B$ even if the diaphragm aperture setting ring 5 is set at the minimum diaphragm aperture or at the maximum diaphragm aperture, as the object brightness is too large or too small, the diaphragm aperture setting ring 5 is locked at the minimum diaphragm aperture or at the maximum diaphragm aperture, the preset exposure time is shifted based on the diaphragm aperture as set above and the memorized object brightness for obtaining proper exposure thus new exposure time is determined. That is, first explanations will be made on the case when the object brightness is too large in a concrete manner. As the resistance between the emitter and the collector of the fourth transistor 43 is so set as being equal to the resistance of the photo-conductive element 26 at the time of photo-sensing, if the object brightness is large the resistance between the emitter and the collector of the fourth transistor 43 takes small value and the terminal A level which is determined by said resistance value and the value of the first variable resistance 46 which is linked with preset exposure time becomes large. And as the claw for checking the sliding plate 10 is released and the sliding piece of the second variable resistance 12 becomes movable, the resistance value of the second variable resistance 12 will be changed from large to small. While the terminal B level becomes large because of this, and before it reaches to the value of the terminal A level the sliding piece of the second variable resistance 12 reaches one extreme end. But as this sliding piece reaches one extreme end, the movable contacting piece of the switch 17 is changed over to the fixed contact side 17b by the projection part 10b of the sliding plate 10. By this the terminal A level becomes lower than the terminal B level and the level detection circuit 49 becomes ON. By this the magnet becomes ON. Therefore the lever 14 is activated and the diaphragm aperture is locked at the minimum diaphragm aperture. And as the switch 47 becomes OFF by the running of the shutter front screen after the diaphragm 2b is stopped down, the condensor 48 is charged according to the object brightness and as this charged voltage that is the terminal A level reaches the terminal B level, the level detection circuit 49 becomes OFF and the magnet 15 is placed in non-excited state. By this the checking of the shutter rear screen is released and proper exposure can be obtained by such exposure time as being so shifted as being faster than the preset exposure time.

Therefore for example when exposure time is set at 1/125 second, the object brightness is too large thus proper exposure can not be obtained even with the maximum diaphragm aperture 16, thus it is necessary to secure diaphragm aperture of greater than 16. But since there is not diaphragm aperture greater than 16 such exposure time as corresponding to the maximum diaphragm aperture 16 must be selected. Therefore the exposure time is so shifted as being faster than the preset exposure time of 1/125 second.

Next, concrete explanations will be made on the case when the object brightness is too small. As the object brightness is small the resistance between the emitter and the collector of the fourth transistor 43 takes large value and the terminal A level becomes small. Therefore even if the claw for checking the sliding plate 10 is released the terminal B level has from the beginning greater value than that of the terminal A and the level detection circuit 49 is in ON state. By this the magnet 15 is in excited state and the movable contacting piece 17a of the switch 17 is changed over to the fixed contact side 17b. And as the switch 47 becomes OFF by the running of the shutter front screen after the diaphragm 2b is stopped down, the condensor 48 is charged according to the object brightness. And as this charged voltage that is the terminal A level reaches the terminal B level the level detection circuit 49 becomes OFF and the magnet 15 is placed in non-excited state. By this the checking of the shutter rear screen is released and proper exposure can be obtained by the exposure time being so shifted as slower than the preset exposure time. Therefore for example, when exposure time is preset at 1/125 second, as the object brightness is small the proper exposure can not be obtained even at the minimum diaphragm aperture of 1.4. Thus it is necessary to secure the diaphragm aperture being smaller than 1.4, but as there is not such diaphragm, such exposure time as corresponding to the minimum diaphragm aperture 1.4 must be selected, therefore the exposure time is so shifted as being slower than the preset exposure time of 1/125 second.

While what has been explained above is the case when diaphragm aperture is determined with shutter preference, now explanations will be made on the case of diaphragm preference. In this case a change over switch which is provided at a camera main body but is not shown in the drawing is changed over to the diaphragm preference side. Then, the movable contacting piece 17a of the switch 17 is changed over to the fixed contact 17b side and at the same time the checking lever 14 of the sliding plate 10 becomes inactive. And the letter showing the desired diaphragm aperture value of the manually operated diaphragm ring 4 is made to match the indication mark of the specular bronze which is not shown in the drawing. At this time as the friction force of the manually operated diaphragm ring 4 is made to be large, the manually operated diaphragm ring 4 will not be rotated by the springs 5b, 10d. Thus the second variable resistance is determined to be such value as corresponding to the set diaphragm aperture value and ASA information. Now the shutter button 18 is pressed, same function as mentioned above will be made and such preparation will be made that the shutter control condensor 48 can be charged at the photo-conductive element 26 according to the amount of light received. At this time as the terminal A level of the level detection circuit 49 is lower than the terminal B level, the magnet is made to be ON to check the shutter rear screen. When the shutter button is pressed further, the stop down driving mechanism is activated and the diaphragm is stopped down, then the shutter front screen runs. As the switch 47 becomes OFF by said running of the shutter front screen, the condensor 48 is charged according to the amount of light received at the photo-conductive element 26. And as this charged voltage that is the terminal A level reaches the terminal B level, the level detection circuit 49 becomes OFF and the magnet 15 is placed in non-excited state. By this the checking of the shutter rear screen is released and proper exposure can be obtained, thus diaphragm preference photographing can be done.

Now the second embodiment of the present invention will be explained referring to FIG. 5 to FIG. 8. FIG. 5 is to show an entire device, wherein 201 is a diaphragm mechanism which is made by arranging a diaphragm ring 202, a diaphragm aperture setting cam ring 203, a manual diaphragm ring 204, a diaphragm aperture setting ring 205, a diaphragm driving ring 206 etc. behind a photographing lens 259 in the order mentioned, and this diaphragm mechanism is so made as mentioned below. That is, a notched part 202a for positioning a bell crank 207 to be described later and holes 202c having a diaphragm 202b of always fully opened nature inserted therein are provided in the diaphragm ring 202, and the diaphragm 202b is to be stopped down when the diaphragm ring 202 is rotated in a counterclockwise direction. The biasing power of this diaphragm ring 202 is preserved in such a way that a connecting rod 202e planted on said diaphragm ring 202 is checked by a pin 206$a_1$ of a projection part 206a of the diaphragm driving ring 206. And a cam plane part 203a and an arm part 203 are provided at the circumference of the diaphragm aperture setting ring 203b, and this cam plane part 203a is in contact with a planting lever 207c of the bell crank 207 positioned at the notched part 202a of the above mentioned diaphragm ring 202. This bell crank 207 is rotated around an rotation axle 207a according to the stroke of the cam plane part 203a to set the position of the pin 207b, and the stop down rotation of the above mentioned diaphragm ring 202 is controlled by the position of said pin 207b. Also the arm part 203b of the diaphragm aperture setting cam 203 engages with the arm part 205a of the diaphragm aperture setting ring 205, and in that engagement relationship the diaphragm aperture setting cam ring 203 is not slided by the sliding in back and forth direction of the diaphragm aperture setting ring 205, instead the diaphragm aperture setting cam ring 203 is rotated by the rotation of the diaphragm aperture setting ring. And the manual diaphragm ring 204 has its projection part 204a engageable with the arm part 203b of the above mentioned diaphragm aperture setting cam ring 203, and when the letters EE punched on the circumference of said manual diaphragm ring 204 is aligned with the indication mark on a specular bronze not shown in the drawing to place the device in the state shown in the drawing, a switch 235 to be described later becomes ON in an association with said manual diaphragm ring 204 thus diaphragm control can be done automatically. Also by having each of the desired diaphragm aperture values matched with the indication mark, setting of any desired diaphragm aperture can be done. And the diaphragm aperture setting ring 205 is biased to rotate in a counterclockwise direction by the spring 205b and at the same time the above mentioned arm part 205c is provided thereon. Said arm 205c engages with a concave part 208a of the preset lever 208. And the diaphragm driving ring 206 is biased to rotate in a clockwise direction, and at the time has an arm part 206c. This arm part 206c engages with a riser part 209a of said stop down lever 209, which is biased to rotate in a counterclockwise direction by the spring 209b, and is to be rotated in a clockwise direction by the action of a stop down lever driving mechanism which is not shown in the drawing by the second stage action of a shutter button 228 of a camera. And a guide hole 208b and a saw teeth shape part 208c are provided at the above mentioned preset lever 208 and a guide pin 210a of a sliding plate 210 is inserted in said guide hole 208b. The claw 210c installed rotatably on said sliding plate 210 by a pin 210b is inserted in the saw teeth shape part 208c of the preset lever 208 so that the relative position between the sliding plate 210 and the preset lever 208 can be varied according to the film sensitivity. But normally the sliding plate 210 and the preset lever 208 move integrally. Also the sliding plate 210 has a rack 210d, and a gear 211 engages with said rack 210d. A gear 212a installed to the rotating axle of the motor 212 engages with said gear 211, and as the motor 212 rotates the sliding plate 210 is shifted through the gear 211. The output signal of a bridge circuit is to be supplied to the motor 212 through an amplification circuit 214. This bridge circuit 215 consists of a second variable resistance 217 linked with the resistance 216 and the sliding plate 210, and a first variable resistor 219 for setting shutter speed to be adjusted by the shutter dial 218, and a photo-conductive element 220. And a diaphragm computation device 232 is composed by said bridge circuit 215, and the diaphragm driving control means 210, 212, etc. The input terminal of said bridge circuit 215 is connected to the direct current power source 222 through the shutter time computation circuit 221. And 223 is a switch for power supply. The light penetrating through the diaphragm 202b having always fully opened nature will be incident on the above mentioned photoconductive element 220 after going through a reflective mirror 224, a Fresnel lens 225 and a condensor lens 226 having a half mirror. This photo-conductive element 220 is made to be changed over and connected by the switch 227 to the bridge circuit 215 and the shutter time determining circuit 221.

Now FIG. 6 is to show the state in which each switch, etc. in linked relationship with the shutter button is positioned, and pins 228a, 228b, 228c, 228d are provided at the axle of the shutter button 228. This pin 228a is for opening and closing the above mentioned switch 223, and the pin 228b is to engage with the lever 230 biased by the spring 229 to rotate in a counterclockwise direction and to conduct the clamp release of the above mentioned gear 211 by the engagement state of said lever 230. Also the pin 228c is for opening and closing the switch 229, and the pin 228d is for change over of the switch 245. And the arm of the shutter button 228 works on the switch change over lever 231 and the switch 227 is changed over by the action of this lever 231. When the shutter button 228 is pressed, after a stop down lever driving mechanism is activated the shutter front screen is made to run. These parts are, by the first step action of the shutter button 228, to perform claming of the gear 211 after the switch 235 is made to be ON and to change over the switch 227 to the shutter time computation circuit 221 side, placing the switch 239 in OFF state and changing over the switch 245 to regenerative side, and after operating a stop down lever driving mechanism not shown in the drawing by the second step action of the shutter button 228, to have the shutter front screen run.

Now, FIG. 7 is to show concretely the exposure control circuit shown in FIG. 5. In this drawing in the diaphragm computation device 232, the amplification circuit 214 of the diaphragm driving control means (210, 212, etc.) which is activated by the output signal of the bridge circuit is connected to between the emitters of the transistors 233, 234, while the above mentioned motor 212 and the switch 235 are connected to the respective position shown in the drawing. Also in the shutter time computation circuit 221, what is shown as 236 is a log-diode which generates such voltage as corresponding to the resistance value of the photoconductive element 220 between the terminals as the above mentioned photo-conductive element 220 is changed over to the shutter time determining circuit 221 by the switch 227. 237 is a memory condensor to have such charging done as corresponding to the terminal voltage of the log-diode 236. 238 is a memory circuit to retain the voltage memorized by the memory condensor 237 as the switch 239 becomes OFF, and this memory circuit 238 consists of first and second field-effect transistors 240, 241. 242 is a transistor for stabilizing the constant current of the memory circuit 238. 243 is a transistor for inversing phase. 244 is a regenerative circuit to flow such current as corresponding to the log-diode 236 at the time of photosensing by changing over the above mentioned log-diode 236 to regenerative side 236. And this regenerative circuit 244 consists of transistors 246a, 246b. 247 is a shutter speed control condensor which is charged by the regenerative current from the regenerative circuit 244. 248 is a start switch which becomes OFF at the same time when the shutter front screen starts running. 249 is a Schmidt circuit as a shutter time determining circuit which places the magnet 250 in a non-excited state as the charged voltage of the condensor 247 reaches a predetermined value. This Schmidt circuit 249 is varible in an association with the sliding plate 210 of the transistors 251, 252, 253 and at the same time comprising the third variable resistance 255 which is variable by film sensitivity.

Next, the function of the device with the above set up will be explained. First explanations will be made on the case of shutter preference. First, the relative position between the sliding plate 210 and the preset lever 208 is changed according to ASA sensitivity of film. And the shutter dial 218 is matched with the desired time to determine the resistance value of the variable resistance 219, and at the same time the letters EE on the manual diaphragm ring 204 is matched with the indication mark on a specular bronze which is not shown in the drawing. At this time the switch 235 is placed in ON state. And as the power supply switch 223 becomes ON when the shutter button 228 is pressed, the motor 212 is rotated by the output of the bridge circuit. By this the sliding plate 210 is shifted thus the diaphragm aperture setting ring 205 is rotated to rotate the diaphragm aperture setting cam ring. Because of this the stroke of the cam plane part 203a is changed and the lever 207a makes follower movement, therefore the bell crank 207 is rotated and the position of the pin 207b is shifted. Also by the rotation of the motor 212 the second and the third variable resistors 217, 255 are made variable. As said second variable resistor 217 becomes variable the servo-motor 212 is stopped when the bridge circuit 215 is placed in a balanced state. By this stopping of the motor 212, the sliding plate 212, the diaphragm aperture setting ring 205, and the diaphragm aperture setting cam ring 203 become inactive to stop shifting of the pin 207b of the bell crank 207, and at the same time the resistance value of the third variable resistance 255 is determined thus the operation level of the Schmidt circuit 249 is determined. Next by the shifting of the pin 228b of the shutter button 228 the gear 211 is clamped and the servo-motor 212 is placed in a locked state. And by the arm of the shutter button 228 the switch 227 is changed over to the shutter time computation circuit 221 side. As the photo-conductive element 220 is connected to the log-diode 207 by this, such voltage $E_1$ as corresponding to the resistance value of the photo-conductive element 220 is generated between the terminals of the log-diode 236 by the current $I_1$ which flows through the photo-conductive element 220, the log-diode 236. By this voltage $E_1$ the memory condensor 237 is charged generating voltage of $E_1$ between its terminals. This voltage $E_1$ is logarithmically in proportional with the resistance value of the photo-conductive element 220 that is the amount of light received. Next, the switch 239 becomes OFF by the pin 228c and the terminal voltage $E_1$ of the condensor 237 is memorized and retained, and after that the switch 245 is changed over to the regenerative side. Because of this the log-diode 236 is connected to the gate of the second field effect transistor 238 of the memory circuit 238, and current $I_2$ flows to the log-diode 236. This current $I_2$ is made to become equal to the current $I_1$ which flows to the log-diode 236 at the time of sensing by the action of the transistor 243 for phase inversion and the transistor 245 of the regenerative circuit 244. Because of this the terminal voltage $E_2$ of the log-diode 236 becomes as $E_2 = E_1$ thus becomes equal to the terminal voltage $E_1$ of the memory condensor 237. When such state is reached, the current $I_2$ between the emitter and the collector of the transistor 246a of the regenerative circuit 244 becomes equal to the current $I_1$ which flows through the photo-conductive element 220 at the time of photo-sensing. That is the resistance value between the emitter and the collector of the transistor 246a becomes equal to the resistance value of the photo-conductive element 220 at the time of photo-sensing. And the condensor 247 is charged by the resistance between the emitter and the collector of the transistor 246b which is so set as making same action as that of said transistor 246a, and the shutter speed is determined using the delay time of the same. And as the shutter button 228 is pressed down further the stop down lever driving mechanism works to rotate the stop down lever 209 in a clockwise direction and to rotate the diaphragm driving ring 206 in a counterclockwise direction. As said rotation of the diaphragm driving ring 206 performs evacuation of the pin 206$a_1$, it allows the rotation of the diaphragm ring 202 through the coupling rod 202e in a counterclockwise direction by the spring 202d. And as the notched part 202 comes in contact with the pin 207b said rotation is stopped and at the same time stop down of the diaphragm 202b is done. Next at the same time as the shutter front screen starts running the start switch 248 becomes OFF and the charging of the condensor 247 is started. And as the charged voltage at the condensor 247 reaches the operating level of the Schmidt circuit which is determined by the third variable resistor 255, the transistor 251 which composes the Schmidt circuit 249 becomes ON and the transistor 252 becomes OFF, while electricity to the magnet 250 for retaining the rear screen is shut off closing the rear screen, thus preset exposure time can not be obtained. And as the pressing of the shutter button 228 is released the switch 248 is changed over to photo-sensing side, and the switch 239 becomes ON to change over the switch 220 to the diaphragm computation device side 232, releasing the clamp of the gear 211, placing the switch 223 in OFF state. Also the stop down lever 209 is returned to its original state after completion of the running of the shutter rear screen, to place the diaphragm 202b in a fully opened state. And as a wind up axle not shown in the drawing is wound up shutter charging and film wind up are done thus preparation for next photographing is done.

While what has been explained above pertains to the case of ordinary object brightness, explanations will be made on the case when the object brightness is too large or too small. When the object brightness is too large the bridge circuit 215 will not be balanced even if the second variable resistor becomes of the minimum resistance value. That is even when the diaphragm aperture setting ring is so set as being stopped down to its extremity the bridge circuit 215 will not be balanced. At this time the resistance value of the photo-conductive element 220 is too small for the preset resistance value of the first variable resistor 219. Therefore, when the photo-conductive element 220 is changed over to the shutter time computation circuit 221 side by the switch 227 appropriate exposure can be obtained by such exposure time as being so shifted as becoming faster than the preset exposure time. When the object brightness is too small the bridge circuit 215 will not be balanced even if the second variable resistor 217 becomes to have the maximum resistance value. That is even if the diaphragm aperture setting ring 205 is not stopped down and is set at fully opened state the bridge circuit 215 will not be balanced. That is, it is greater than the resistance value of the photo-conductive element 220. Therefore when the photo-conductive element 220 is changed over to the shutter time computation circuit 221 side by the switch 227 appropriate exposure can be obtained by the exposure time being so shifted as being slower than the preset exposure time.

While what has been explained above is for the case when diaphragm aperture is determined with shutter preference, now explanations will be made on the case of diaphragm preference. In this case, as the third variable resistance 255 is linked with the sliding plate 210 through the diaphragm aperture setting ring 205 and the preset lever 208, when the letters EE on the manual diaphragm ring 204 is removed from the indication mark on the specular bronze the switch 255 becomes OFF. And as the manual diaphragm ring 204 is set at a desired value, the diaphragm aperture setting ring 205 is rotated accordingly and the value of the third variable resistance is determined. Now, as the shutter button 228 is pressed the diaphragm ring 202 is rotated in a same manner as in the case of shutter preference to stop down the diaphragm 202b, thus shutter time is determined.

In the above example the case when a servomotor 212 is used was explained. But the present invention is not limited to this, instead, for example it can be embodied by replacing with a meter 260 as shown in FIG. 8. That is the second variable resistance is activated by one end of a pointer 260a of the meter 260. As the meter 260 is stopped when the bridge circuit 260 is balanced, the rotation angle of the saw teeth ring 261 is controlled by the other end of the pointer 260b as in an EE camera to control the sliding plate 210 through the gear 211 as in the above mentioned case.

While the drawings shown an electronics shutter circuit containing a memory means, the device of the present invention can be applied to an electronic shutter not containing a memory means.

Now, the third embodiment of the present invention will be explained referring to FIG. 9 to FIG. 10. The exposure computor has as shown in FIG. 9, an amplification circuit 3100 and a level detection circuit 3101, and a photo-electric light receiving element 301 is so arranged as receiving the light reflected from a half mirror 302a obliquely provided within a condensor lens 302 in a finder optical system through an auxiliary diaphragm 303.

E is a power source battery, M is an electro magnet, $R_1$ is a variable resistor for shutter speed setting, $R_2$ is a variable resistor for film sensitivity setting, $R_3$ is a bleeder resistance, $C_2$ is a regenerative condensor, SM is a main switch which is opened or closed in an association with a shutter release button, $S_1$ is a change over switch which is associated with a change over ring described later and a shutter release button, and $S_2$ is an opening and closing switch which is linked with a shutter front screen. 3100 is an amplification circuit shown within broken line in FIG. 10. $D_1$ is a log-diode having logarithmic characteristics. $C_1$ is a memory condensor. $FET_1$, $FET_2$ are field-effect transistors which compose a differential amplification circuit. $D_2$ is a regenerative log-diode. $T_1$, $T_2$, $T_3$ are transistors for the regenerative circuit. $T_4$ is a transistor for constant current. $D_3$ is a diode for constant current. $S_3$ is an opening and closing switch linked with the shutter release button.

The auxiliary diaphragm 303 provided in front of the light receiving element 301 is coupled with a diaphragm preset cam of an exchange lens through a gear train 304, 305, 306 and a rack plate 307. The rack plate 307 is slidably supported at the camera body, and is biased downward by a spring 308, and has at its lower end an engagement part 307a which contacts with an arm 309a of a preset linked ring 309 of an exchange lens. Said linked ring 309 is provided in such a manner that it engages with a preset cam ring 310 in such a manner as slidable each other to a back and forth direction so that they can rotate integrally around an optical axis, and is biased by a spring 311 to such direction as engaging with an arm 312a of a preset and change over ring 312.

313 is a diaphragm ring having a plural number of diaphragm blades 314 and is biased to rotate to stop down direction, and a pin 313a extending from said ring 313 in a backward direction engages with an arm 216a of a diaphragm driving ring 316, and is pulled by a spring 317 which is stronger than the above mentioned spring 315 thus it is stopped ordinarily at a position of fully opened aperture position. 318 is a stop member corresponding to the diaphragm ring 313 and is axially supported within a specular bronze in a rotatable manner. A pin 318a at its one end contacts with a cam plane of the preset cam ring 310 and the stopping position of the diaphragm ring 313 is controlled by the other pin 318b.

The rack plate 307 is shifted upward while accumulating the power in the spring 308 in an association with film wind up or shutter charge operation by an association mechanism not shown in the drawing, to open the auxiliary diaphragm 303 through the gear row, and at the same time the arm 309a is accompanied by the engagement part 307a for rotating the association ring 309 and the preset cam ring 310 which is engaged therewith in a clockwise direction resisting the force of the spring 311. When they reach a predetermined position the auxiliary diaphragm 303 is fully opened and the cam ring 310 is set at a fully opened aperture value and is retained at said position by a retention member 307' which is biased by a spring.

319 is a checking claw provided separately from the above mentioned retention member and is, in this example, so axially supported as can be engaged and disengaged to from the gear 306 to control the shifting of the rack plate 307 by a magnet M, and it is normally pulled by a spring 324 to engage with a stopper 325 for stopping the gear 306 at non-checked position.

321 is a swing lever being axially provided in such manner that its forward end engages with the lower plane at rear end of the checking claw 319 can be retained at a checked position, and is given a rotating characteristics to left side by a weak spring 323 and contacts with a rear screen signal member 322 and is stopped.

When exposure is made with shutter preference, the resistance value of the variable resistances $R_1$ and $R_2$ of the circuit are set in an association with the shutter speed and film sensitivity, and the preset and change over ring 312 is rotated in a counterclockwise direction so that the shutter preference mark (EE) provided at such position of the scale as exceeding the minimum diaphragm value is matched with an indication mark 326, thereby the switch $S_1$ is changed over from $e$ side to $d$ side to connect the variable resistor $R_1$ for shutter speed setting to the circuit.

When shutter charge and film wind up operation is done by a conventionally known wind up mechanism, as explained above, the rack plate 307 is shifted upward to fully open the auxiliary diaphragm 303 in front of the light receiving element, and the preset cam ring 310 comes off the arm 312a of the preset ring 312 and is preset at the position of a fully opened diaphragm aperture value. The preset ring 312 is retained at EE mark position by a click stop device which is not shown in the drawing. At this time switch SM is opened, the switch $S_1$ is as described above contacting with $d$ side while $S_2$, $S3$ are closed.

As the camera is pointed toward an object and a shutter button (not shown in the drawing) is pressed down, first main switch SM is closed in an association therewith and current flows to the circuit. Next, the retention member 307' of the rack plate 307 is released and the rack plate 307 starts shifting downward to gradually stop down the diaphragm 303 through the gear row 306, 305, 304 and at the same time the preset cam ring 310 is rotated in a counterclockwise direction through an association ring 309.

The terminal $b$ level $Vb$ of the level detection circuit 3101 is given by the ratio between the bleeder resistance $R_3$ and the film sensitivity resistance $R_2$, while the terminal $a$ level $Va$ is given as the ratio between the output resistance of the transistor $T_3$ having same resistance value as that of the transistor $T_2$ and the shutter speed resistance $R_1$. They ae so set than when $Va$ becomes lower than $Vb$ the magnet M becomes ON by the output of the detection circuit.

Such potential difference as same as the log-diode $D_1$ appears between terminals of the memory condensor $C_1$ with the ratio between the light receiving element 301 and the log-diode $D_1$, and the voltage $C_1$ is generated between the terminals of the log-diode $D_2$ by the automatically balanced circuit and the ratio between the element 301 and the diode $D_1$ is regenerated as the ratio between the output resistances of the diode $D_2$ and the transistor $T_2$. Therefore the terminal $a$ level $Va$ will become such value as proportionate with the amount of the light received by the light receiving element 301, and as the aperture of the auxiliary diaphragm 303 gradually becomes small the level $Va$ becomes lower than the level $Vb$, then the electro magnet M becomes ON by the output of the detection circuit 3101.

The magnet M attracts the rear end of the checking claw 319 resisting the spring 324 to engage the forward end of the claw 319 with the gear 306 to stop the rack plate 307 and the auxiliary diaphragm 303 at their position and lock the same, thus the diaphragm is preset at an appropriate value.

The swing level 321 is pulled by the spring 323 to rotate to left hand direction and engages with the rear screen signal member 322 at the position where its upper end can engage the lower plane of the checking claw 319. At this time the magnet M simultaneously works on the rear screen checking member (not shown in the drawing) of the focal plane shutter to shift the rear screen to the checked position.

When the switch $S_1$ is changed over to $e$ side in association with the further pressing down of the shutter button and the switch $S_2$ is opened the terminal voltage of the log-diode $D_1$ is logarithmically compressed and is memorized by the memory condensor $C_1$.

As the shutter button is pressed down further the diaphragm stop down lever 327 of the camera is rotated to the direction shown by an arrow and the arm 316$b$ of the lens diaphragm driving ring 316 is pushed by the forward end of said lever 327 and is rotated in a counterclockwise direction. And the diaphragm ring 313 which engages with the arm 316$a$ at the pin 313$a$ makes follower movement with said ring 316 by the spring 315 and is rotated until it is stopped by the stopper 318 to stop down the diaphragm to the preset value. At the same time with this, the finder 320 jump up to have the front screen of the shutter started and the switch $S_2$ is opened in an association therewith, at this time the terminal $a$ level of the detection circuit becomes zero and as the switch $S_2$ is opened such current as corresponding to the potential difference memorized in the memory condensor $C_1$ is expanded by the log-diode $D_2$ and flows to the condensor $C_2$, and at the same time when the terminal $a$ level $Va$ of the detection circuit 3101 exceeds the terminal $b$ level $Vb$ the magnet M becomes OFF, releasing the rear screen checking member to start the shutter rear screen. At this time the checking claw 319 is prevented from rotating by the swing lever 321 not releasing the checking of the gear 306 and the rack plate 307 and the auxiliary diaphragm 303 is stopped.

When shutter operation is completed the stop down lever 327, the finder mirror resumes its original position and the diaphragm aperture is returned to fully opened state. As the rear screen signal member 322 is shifted to the right at its final process to rotate the swing lever 321 to the right, the checking lever 319 is rotated with the force of the spring 324 to release the checking of the gear 306, and the rack plate 307 is pulled by the spring 308 and is moved downward, while the auxiliary diaphragm 303 and the cam ring 310 are also rotated to their final position that is the position equivalent to the minimum diaphragm.

As the pressing of the shutter button is released the main switch SM is opened, while the switch $S_1$ returns to $d$ side, and the $S_2$ is returned to closed state and so is the switch $S_3$.

The rear screen signal member 322 comes off the swing lever 321 with next shutter charge and is shifted to left hand direction. In the event fast shutter speed is set against a dark object that is shutter speed is not appropriate when exposure is to be made with shutter preference system, as the shutter button is pressed to close the main switch SM the terminal $a$ level $Va$ of the detection circuit is lower than the terminal $b$ level, therefore the magnet M becomes immediately ON and the auxiliary diaphragm 303 is locked as it is fully opened, while the cam ring 310 will not be moved from its fully opened position.

As the shutter button is further pressed down as in exactly the same manner as in the above mentioned case, the switch $S_1$ is changed over to $e$ side and the switch $S_1$ is opened, then the amount of light which has passed through the fully opened auxiliary diaphragm is sensed and is memorized in the memory condensor $C_1$, and as the switch $S_2$ is opened at the same time when the shutter front screen is started the terminal $a$ level becomes higher than the terminal $b$ level after an elapse of such time as determined by the time constant circuit consisting of the transistor $T_3$ and the condensor $C_2$, and the magnet becomes OFF, thus appropriate exposure time can be obtained although it is different from the set shutter speed.

Contrary to this, when such shutter speed is set as too slow for a bright object, the terminal a level of the level detection circuit is higher than the terminal $b$ level thus the magnet M will not function even if the rack plate 307 is shifted to its final position and the auxiliary diaphragm 303 is stopped down to the minimum aperture.

But as the switch $S_1$ is charged over to $e$ side in an association with the shutter button the terminal a level is lowered and the magnet M becomes ON. Then such shutter speed as providing appropriate exposure can be obtained in a same manner as mentioned above.

Next, when exposure is made with diaphragm preference system, first a change over member of the association mechanism not being shown in the drawing is operated to cut the association between the wind up mechanism and the rack plate 307, and the retention claw 307' is rotated in a clockwise direction to rotate the change over and diaphragm preset ring 312 is rotated and the desired diaphragm aperture value on the scale is aligned with the indication mark 326. The rack plate 307 makes follower movement after the present ring 312 to set the cam ring 310 and the auxiliary diaphragm 303 at a desired value and stop them at that position by the click-stop of the ring 312. Also as the ring 312 comes off the EE position the switch $S_1$ is changed over from $d$ side to $e$ side and the shutter speed setting resistance $R_1$ comes off the computation circuit thus the condensor $C_2$ is connected.

In an association with the pressing down of the shutter button the main switch SM is closed and current flows to the circuit, then the terminal $b$ level of the level detection circuit 3101 is set as $Vb'$ by the film sensitivity resistance $R_2$ while the terminal $a$ level is lower than the terminal $b$ level $Va'$ since the switch $S_2$ is closed, therefore the magnet M becomes ON and the rack plate 307 is locked with the checking claw 319. Next as the switch $S_3$ is opened from the amount of light passing through the auxiliary diaphragm 303 corresponding to preset diaphragm value appropriate exposure time can be obtained in a same manner as described above.

The fourth embodiment of the present invention will now be explained with reference to FIG. 11 to FIG. 14 by way of example in a form of embodiment of the invention.

FIG. 11 shows the whole structure of the device, and the reference numeral 401 designates a diaphragm mechanism which is provided with constitutional members such as a diaphragm ring 402 located at the rear of a photographing lens 460, a cam ring 403 for settling the diaphragm, a manually movable diaphragm ring 404, a diaphragm settling ring 405, a diaphragm driving ring 406 and so on in an arrangement in sequence.

The above mentioned diaphragm mechanism 401 is constructed in such a manner as described hereinafter. In other words, the diaphragm ring 402 is provided with a notched portion 402a for arranging a bell crank 407, which will be explained hereinafter, and an aperture 402c engaging therewithin a constant opened diaphragm 402b, and the diaphragm ring 402 is subjected to rotate in a counterclockwise direction due to a helical spring 402d so as to close the above mentioned diaphragm 402b, which is left opened constantly, at the counterclockwise rotation of the diaphragm ring 402. The actuation to the diaphragm ring 402 is accummuated in such a manner that a connecting rod 402e embedded at one end thereof into the diaphragm ring 402 is clinched at the other end thereof to a pin 406a$_1$ of a boss 406a formed on the diaphragm driving ring 406. Further, the diaphragm settling cam ring 403 is provided on the peripheral edge thereof with a cam surface area 403a and an arm 403b, and the cam surface area 403a is brought into contact with a studded lever 407c of the bell crank 407 disposed on the notched portion 402a of the diaphragm ring 402. The bell crank 407 is adapted to be rotated about a rotary shaft 407a corresponding to the stroke of the cam surface area 403a so as to settle the position of the pin 407b, and the position of the pin 407b effects to define the rotary movement of the diaphragm ring 402 for closing the diaphragm. The arm 403b of the diaphragm settling cam ring 403 is engaged with an arm 405a of the diaphragm settling ring 405, and in this engagement relationship, the diaphragm settling cam ring 403 will not slide due to the sliding movement of the diaphragm settling ring 405 along the front and rear directions, but is adapted to rotate due to the rotary movement of the diaphragm settling ring 405. Furthermore, a boss 404a of the manually movable diaphragm ring 404 is disposed to be engageable with the arm 403b of the diaphragm settling cam ring 403, so that when the characters EE engraved on the peripheral edge of the manually movable diaphragm ring 404 are set to be coincident with an indication sign marked on a lens barrel (not shown in the drawings), a switch 435 hereinafter described is adapted to interlock with the manually movable diaphragm ring 404 to be shifted ON position so as to effect automatically diaphragm control operation, and any desired diaphragm opening can be settled by each of diaphragm values to be coincident with the indication sign. And, the diaphragm settling ring 405 is adapted to be actuated in the counterclockwise rotation due to a helical spring 405b, and is also provided with the other arm 405c which is arranged to extend in the opposite direction to the afore-mentioned arm 405a. This oppositely extending arm 405c is held at the forward end thereof by a hooked portion 410a of a slidable plate 410. The diaphragm driving ring 406 is actuated in the clockwise rotation due to a helical spring 406b, and is provided with an arm 406c which is adapted to be in touch with an upright end portion 409a of a diaphragm closing lever 409. This diaphragm closing lever 409 is adapted to be actuated in a counterclockwise rotation due to a helical spring 409b, and also to be actuated in a clockwise rotation through a driving means (not shown) for the diaphragm closing lever when a shutter button 428 of a camera is pressed downward. The slidable plate 410 is provided with a toothed-rack 410d which is engaged with a toothed wheel 411. This toothed wheel 411 is also engaged with another toothed wheel 412a attached to the rotary shaft of a motor 412, so that when the motor 412 is driven to rotate, the slidable plate 410 is adapted to move through the medium of the toothed wheels 412a and 411. In this way, the output signal of a bridge circuit 415 acting as a comparative detecting circuit is applied to the motor 412 through an amplifying circuit 414. This bridge circuit 415 comprises a resistance 416, a variable resistance 417 for settling ASA sensitivity to be interlocking with a variably resistance 455 in such a manner that the value of the former 417 turns out small when the value of the latter 455 is brought forth to be large, a variable resistor 419 for settling the shutter speed adjusted by a shutter dial 418 and a photo-conductive element 420, thus a diaphragm deciding circuit 432 is formed with the foregoing bridge circuit 415 and a diaphragm driving control circuit 413.

Both of the input end of the bridge circuit 415 and a circuit 421 for deciding shutter speed are connected with DC power source 422, and the reference numeral 423 denotes a switch for supplying an electric current to the above mentioned circuit from the power source. The foregoing photo-conductive element 420 is arranged to receive thereupon an incident light which has transmitted through the diaphragm 402b left opened constantly and is adapted to refract at a reflector 424 and passes in sequence through a Fresnel's lens 425 and a capacitor lens 426 having a half mirror. This photo-conductive element 420 is adapted to be connected with both of the diaphragm deciding circuit 432 and the circuit 421 for deciding the shutter speed in cut-over manner by means of a changeover switch 427.

Now, FIG. 12 shows the arrangement of each of switches and other constitutional members which are in an interlocking relation to the shutter button, wherein the shutter button 428 is provided on the mandrel thereof with a series of pins 428a, 428b, 428c and 428d. The first pin 428a is used for acting to open and close the foregoing switch 423, the second pin 428b effects to hold the lever 430 which is actuated to rotate in a counterclockwise direction due to a spring 429 so as to clamp the toothed wheel 411 or to release the toothed wheel 411 from clamped state corresponding to the condition of the pin 428b whether it be touched on or detached from the lever 430. The third pin 428c serves for opening and closing of a switch 439, and the fourth pin 428d acts to cut over a switch 445, thus an arm of the shutter button 428 is functional on a lever 431 which is adapted to actuate to cut over a switch 427. The shutter button 428 is also functional on driving the shutter front screen by the processes taken in sequence that when the shutter button 428 is pushed downward, a switch 457 is shifted to "ON" position so as to drive the diaphragm closing lever 409, then to clamp the toothed wheel 411, and to cut over the switch 427 to the side of the circuit 421 for deciding the shutter speed, subsequently to cut over the switch 439 to "OFF" position, and then to cut over the switch 445 to the side for reapplication, further to actuate the shutter front screen to start its running motion.

FIG. 13 illustrates in a concrete way the exposure control circuit shown in FIG. 11, and in the diaphragm deciding circuit 432, the amplifying circuit 414 of the diaphragm driving control circuit 413 which turns out operative by the output signal of the bridge circuit 415 and which comprises transistors 433 and 434, thereby the motor 412 is connected between emitters of the transistors 433 and 434. In the shutter speed deciding circuit 421, the reference numeral 436 represents a log-diode generating between terminals the compression voltage corresponding to the resistance value of the photo-conductive element 420 when the foregoing photo-conductive element 420 is cut over to the side of the shutter speed deciding circuit 421 by means of the switch 427, and 437 designates a memory capacitor which is charged an electric pressure corresponding to the terminal voltage of the log-diode 436, and 438 indicates a memory circuit for maintaining securely the voltage memorized in the memory capacitor 437 after the switch 439 is shifted to "OFF" position, and this memory circuit 438 is composed of the first and the second transistors 40 and 41 of the field effect type. The reference numeral 442 is a transistor for stabilizing constant current of the memory circuit 438, 443 denotes a phase-reversing transistor, 44 designates a regeneration circuit for applying an electric current corresponding to an electric current supplied to the log-diode 436 at the photometry by means of cutting over the foregoing log-diode 436 to the regenerating side b due to changing over the switch 445. The regeneration circuit 444 mentioned above comprises transistors 446a and 446b. The reference numeral 447 is a shutter speed control capacitor which is charged with regenerated current supplied from the regeneration circuit 444, 448 represents a starting switch which is subjected to be turned out "OFF" upon the shutter front screen starts running and to be shifted to "ON" upon the shutter rear screen terminates its running motion, 449 is a Schmidt's circuit for converting a magnet 450 into a non-excitation condition when the capacitor 447 is charged to the predetermined value of voltage, and this Schmidt's circuit 449 consists of transistors 451, 452 and 453, and a variable resistance 455 for settling ASA sensitivity interlocking with the variable resistance 417.

Now, the functional operation of the mechanism mentioned above will be explained as under.

For the first place, the elucidation will be given in case of the shutter is considered to be preferential. At first, the shutter dial 418 is set to be coincident with the desired second in speed so as to decide the resistance value of the varible resistance 419, and the resistance values of the variable resistances 417 and 455 for settling ASA sensitivity, which are adapted to interlock with each other, are set due to the ASA sensitivity of films to be used, and further the characters EE engraved on the periphery of the manually movable diaphragm ring 404 are arranged to be coincident with the indication sign marked on a lens barrel which is not shown in the drawings, thus the switch 435 is interlocked with the manually movable diaphragm ring 404 to be shifted to "ON" position. Then, upon the shutter button 428 being pushed downward, the switch 423 for supplying an electric current from the power source turns to "ON" state and the diaphragm closing lever 409 rotates in a clockwise direction. Due to the rotational motion of the diaphragm closing lever 409, the diaphragm driving ring 406 is rotated in a counterclockwise direction against the elasticity of the spring 406b, thereby the pin 406a together with the connecting rod 402e rotate in a counterclockwise direction, so that the diaphragm 402b is brought about to follow the surface area 403a of the diaphragm settling cam ring 403. By virtue of turning the switch 423 to "ON" state, the motor 412 is actuated to be driven in motion due to the output of the bridge circuit 415 whereby the slidable plate 410 is displaced to cause the rotational motion of the diaphragm settling ring 405 so as to rotate the diaphragm settling cam ring 403. As a result of the above mentioned operation, the stroke of the cam surface area 403a is varied to admit the following motion of the lever 407c, thus causing the rotation of the bell crank 407 as well as transference of the position of the pin 407b. Accordingly, the diaphragm ring 402 is subjected to rotate following to the transference of the pin 407b, thus the diaphragm 402b is controlled. In short, the motor 412 is driven due to the output of the bridge circuit 415 so as to control the diaphragm 402b of a photographing lens 460. In the foregoing procedure, an incident light upon the photo-conductive element 420 is adjusted to vary the resistance value of the photo-conductive element 420, then to discontinue the operation of a servo-motor 412 when the bridge circuit 415 is turned to be balanced. Owing to the aforementioned discontinuity of the servo-motor 412, the slidable plate 410, the diaphragm settling ring 405, the diaphragm settling cam ring 403 are turned to be inactive, and th pin 407b of the bell crank 407 is discontinued in its transference. In this way, the diaphragm 402b is decided to a correct diaphragm value due to the position of the servo-motor 412 discontinued. Subsequently, by virtue of the movement of the pin 428b provided on the shutter button 428, the lever 430 is adapted to be actuated in a counterclockwise rotation so as to clamp the toothed wheel 411 and to keep it on the diaphragm 402b in locked condition which was decided to an appropriate diaphragm value. Subsequently, the switch 427 is changed over to the side of the shutter deciding circuit 421 by virtue of the arm of the shutter button 428, thereby the photoconductive element 420 is connected with the log-diode 436, thus compressed voltage $E_1$ corresponding to the resistance value of the photo-conductive element 420 is generated between the terminals of the log-diode 436 by virtue of an electric current $I_1$ flowing through the photo-conductive element 420 and the log-diode 436. The memory capacitor 437 is charged with the foregoing voltage $E_1$ and an electric pressure having the value of $E_1$ is generated between the terminals of the memory capacitor 437. This voltage $E_1$ has a logarithmic relation with the resistance value, that is, light receiving amount of the photo-conductive element 420. Then, the switch 439 is turned to "OFF" due to the pin 428c and the terminal voltage $E_1$ of the capacitor 437 is held on to be memorized. After that, the switch 445 is changed over to the regeneration side b. Therefore, the log-diode 436 is connected with the gate of the transistor 441 of the second field effect type provided in the memory circuit 438, so that an electric current $I_2$ is applied to the log-diode 436. The aforementioned electric current $I_2$ is adapted to be equivalent to the electric current $I_1$ applied to the log diode 436 at the time of photometry by virtue of functions of the phase-reversing transistor 443 and the transistor 446a in the regeneration circuit 444.

In such manner as mentioned above, the terminal voltage $E_2$ of the log-diode 436 is brought about at the value indicated by the equation $E_2 = E_1$ to be equivalent to the voltage $E_1$ of the memory capacitor 437 generated at both ends thereof. In such condition as mentioned hereinbefore, the electric current $I_2$ between the emitter and the collector of the transistor 446a provided in the regeneration circuit 444 is turned to be equivalent to the electric current $I_1$ flowing in the photo-conductive element 420 at the time of photometry. In other words, the resistance value between the emitter and the collector of the transistor 446a is turned to be equivalent to the resistance of the photo-conductive element 420. And, the capacitor 447 is charged by virtue of the resistance between the emitter and the collector of a transistor 446b which is settled to be functional in equivalence to the foregoing transistor 446a, thereby the shutter speed is adapted to be decided by making use of the delayed time, thus by virtue of the shutter button 428 in the subsequent pressing action, the starting switch 448 is turned to be "OFF" upon starting the running motion of the shutter front blades, and the charging is started to the capacitor 447. When the voltage to be charged to the capacitor 447 comes to the pre-determined value, the transistor 451 consisting a Schmidt's circuit is turned to "ON" while the transistor 452 is brought about to be "OFF". In this stage of the operation, the base potential of the transistor 453 is raised up to be turned to "OFF", thereby an electric current to be supplied to the magnet 450 for holding the rear blades of the shutter is dis-c continued so as to close the rear blades, and the switch 448 is turned to "ON" by a signal (not shown) informing the conclusion in the movement of the rear blades, so that pre-set exposure time by second as well as an appropriate exposure can be obtained. When the shutter button 428 is released from being pressed-down condition, the switch 445 is changed over to the photometry side a, and the switch 439 is turned to "ON", then the switch 429 is changed over to the side of the diaphragm deciding circuit 432, and the toothed wheel 411 is released from clamped condition, further the diaphragm closing lever 409 comes to the initial position and the diaphragm 402b is brought about to be opened, thus the switch 423 is turned to "OFF".

In the embodiment of the present invention hereinbefore explained, when the switch 423 for power source is turned to "OFF", and electric current is not applied to the servo-motor 412, so that the slidable plate 410 is adapted to be moved back to the lowest end as shown in FIG. 11 by virtue of the spring 405b arranged at the side of the lens. Then, by winding a take-up shaft which is not shown in the drawing, the shutter charge and a film is taken up to be ready for the subsequent photography.

In the aforementioned case, the elucidation is given when the object brightness is in usual condition. However, the following description will now be given in the case whether the object brightness is observed to be too large or too small. In case of the object brightness comes to excessively large, the bridge circuit 415 is not balanced even though the diaphragm 402b is set to be in the largest diaphragm. In such a case, the resistance value of the photo-conductive element 420 comes to smaller than the resistance value of the photo-conductive element 420 which corresponds to the variable resistance 419 interlocking with the pre-settled exposure time in second. Accordingly, when the switch 427 is changed over to the side of the shutter speed deciding circuit 421, correct exposure can be obtained by an exposure time in second which is shifted to be faster than the pre-settled exposure time in second. In order to obtain correct exposure, for instance, when the exposure time in second is set at 1/125 sec., correct exposure will not be obtained even though the diaphragm is set to the minimum diaphragm 416, because of the object brightness being large, actually it should be closed more than the diaphragm 416, but it is not provided such a diaphragm as that more than 416, so that exposure time in second which is coincident with the minimum diaphragm 416 should be selected, thus the exposure time in second is subjected to be shifted so as to become faster than the pre-settled exposure time of 1/125 sec.

In case of the object brightness being small, the bridge circuit 415 is not balanced even when the diahragm 402b is set to the maximum diaphragm. At this time, the resistance value of the photo-conductive element 420 is turned to be larger than the resistance value of the photo-conductive element 420 which corresponds to the variable resistance 419 interlocking with the pre-settled exposure time in second. Accordingly, when the switch 427 is changed over to the side of the shutter speed deciding circuit, correct exposure can be obtained by virtue of the exposure time in second which is shifted to be delayed to the pre-settled exposure time in second. In order to obtain correct exposure, for instance, when the exposure time in second is settled to 1/125 sec., correct exposure can not be obtained even though the diaphragm is set to the maximum diaphragm 414 because of the object brightness being small, and actually it should be brought about the diaphragm more than the diaphragm 414, but no diaphragm more than the foregoing diaphragm is provided in the mechanism, it should be selected the exposure time in second which is coincident with the maximum diaphragm 414, so that the exposure time in second is subjected to be shifted for delayed time to presettled exposure time of 1/125 sec.

The above explanation is set forth in the case that the diaphragm is decided taking preference on the shutter, but the following elucidation will now be given in the case when the diaphragm is given preference. In this case, when the characters EE of the manually movable diaphragm ring 404 are disconnected from the indication sign of the lens barrel, the interlocking switch 435 is turned to "OFF",and by settling the manually movable diaphragm ring 404 to the desired value, the diaphragm settling ring 405 is adapted to rotate corresponding to the above settlement, thereby, the position of the diaphragm settling cam ring 403 is decided. Then, the shutter button 428 is pushed downward, the diaphragm ring 402 is actuated to be rotated so as to close the diaphragm 402b in the similar manner to the case where the shutter takes preference. In this instance, the servo-motor 412 is not rotated, since the switch 435 is turned out to be "OFF". The light, which was transmitted through the diaphragm 402b converted into a smaller opening by the aforementioned process and a photographing lens 460, is received by the photo-conductive element 420 so as to decide the shutter time in second similar to the case where the shutter is given preference.

The aforementioned embodiment is explained with reference to the case of utilizing the servo-motor 412, but the present invention is not limited to the above mentioned case, but a level detecting circuit can be used in the diaphragm deciding circuit 432 as shown in FIG. 14. A brief description will now be given with reference to FIG. 14.

The reference numeral 4101 designates a battery serving as a power source, 4102 denotes an interocking switch for supplying an electric current from the power source, 4103 indicates a magnet for locking a diaphragm. 4104 represents a silicon controlled rectifying element, 4105 is a variable resistance for ASA sensitivity which is in an interlocking relationship to the variable resistance 455 for ASA sensitivity same as above provided in the shutter speed setting circuit 421, 4106 is a variable resistance for settling the shutter speed, 4107 and 4108 are a resistance respectively, 4109 is a switch which is turned to "OFF" in case of the shutter is given preference while turning to "ON" in the case that the diaphragm is given preference. Other reference numerals besides the above mentioned designate the identical members with those having the corresponding numerals.

The functional operation in case of the shutter preference will be explained hereinafter as comparing with the description set forth hereinbefore excluding the description of the operation identical with the above mentioned. The interlocking switch 4102 for supplying an electric current from the power source corresponding to the switch 423 for supplying an electric current from the power source shown in FIG. 13 is brought about to be closed so as to flow an electric current to the circuit. The level at one end A of the input of the level detecting circuit 4200 is decided by virtue of the settled resistance value of the variable resistance 4105 for ASA sensitivity which is in an interlocking relationship to the variable resistance 455 for ASA sensitivity provided in the shutter speed setting circuit 421, and the level at the other end B of the input of the foregoing level detecting circuit 4200 is gradually raised up by virtue of the resistance value of the photo-conductive element 420 upon which receives an incident light transmitted through the diaphragm 402b actuated to be in opening motion together with the settled resistance value of the variable resistance 4106 for settling the shutter speed, and when the level B comes to be coincident with the level A, the silicon controlled rectifying element 4104 is turned to "ON" by virtue of the output of the level detecting circuit 4200, thus an electric current is applied to the magnet 4103 for locking the diaphragm so as to lock the diaphragm 402b. Subsequently, the switch 427 is changed over to the shutter speed deciding circuit 421 similar to the process as mentioned hereinbefore. Further process is carried out in the similar manner as mentioned above, and when the interlocking switch 4102 corresponding to the above described switch 423 turns to "OFF", the silicon controlled rectifying element 4104 turns also to "OFF". And the mechanism for opening the diaphragm 402b and the mechanism for locking the diaphragm are shown respectively in FIG. 14b.

In the aforementioned description, the diaphragm is actuated by the servo-motor 412 and the diaphragm is locked by way of interlocking with the operation of the shutter button, however, in FIG. 14b, the slidable plate 410 is moved by a helical spring 461 and the diaphragm is actuated by means of the slidable plate as is similar to the foregoing process, furthermore, the diaphragm is adapted to be locked by means of the magnet 4103 for locking the diaphragm and the lever 460. At the time of shutter charge (not shown in the drawings), the slidable plate 410 is charged along the downward direction as shown in FIG. 14b. In FIG. 14b, the slidable plate 410 is so arranged as to be moved in the downward direction by means of the lever 4109 constituting a ratchet and a helical spring 4110, but to be moved in the upward direction when the lever 4109 is displaced downward by the pushing-down action of the shutter button (not shown). In case of the diaphragm preference, the switch 4109 corresponding to the interlocking switch 435 of FIG. 13 is, as mentioned hereinbefore, turned to "ON", and the switch 4102 also turns to "ON" by way of interlocking with the action of the shutter button, further the silicon controlled rectifying element 4104 turns out to "ON", thus the magnet 4103 for locking the diaphragm is turned to "ON", so that the slidable plate 410 is fixed to the location at the lowest end as shown in FIG. 14b. Accordingly, the arm 405c of the diaphragm settling ring 405 is able to move freely so as to settle the diaphragm freely, and the diaphragm 402b is actuated in the similar process as mentioned above to be turned out in a smaller opening at a pre-settled value for taking a photograph due to the pushing-down action of the shutter button 428.

The fifth embodiment of present invention will now be explained with reference to FIG. 15 to FIG. 17. FIG. 15 shows the whole structure of the apparatus, and the reference numeral 50 designates a diaphragm mechanism provided with constitutional members arranged one after another in sequence such as a diaphragm ring 502 at the rear of a photographing lens 560, a cam ring 503 for setting the diaphragm, a manually movable diaphragm ring 504, a diaphragm setting ring 505, diaphragm driving ring 506 and so on. This diaphragm mechanism 501 is constructed in such a manner as mentioned under. In other words, the diaphragm ring 502 is provided with a notched portion 502a for arranging a bell crank 507 which will be described hereinafter and an aperture 502c engaging with a constantly opened diaphragm 502b, and the diaphragm ring 502 is subjected to rotate in a counterclockwise direction due to a helical spring 502d so as to close the above mentioned diaphragm 502b at the counterclockwise rotation of the diaphragm ring 502. The actuation to the diaphragm ring 502 is accumulated is such a manner that a connecting rod 502e embedded at its one end into the diaphragm ring 502 is clinched at its other end to a pin 506$a_1$ of a boss 506a formed on the diaphragm driving ring 506. Further, the diaphragm setting ring 503 is provided on the peripheral edge thereof with cam surface area 503a and an arm 503b, and the cam surface area 503a is brought into contact with a studded lever 507c of the bell crank 507 disposed on the notch portion 502a of the foregoing diaphragm ring 502. The bell crank 507 is adapted to rotate about a rotary shaft a rotary shaft 507a corresponding to the stroke of the cam surface area 503a so as to set the position of the pin 507b, and the position of the pin 507b defines the rotary motion of the diaphragm ring 502 for closing the diaphragm.

The arm 503b of the diaphragm setting cam ring 503 is engaged with an arm 505a of the diaphragm setting ring 505, and in the relation of this engagement, the diaphragm setting cam ring 503 will not slide due to the sliding movement of the diaphragm setting ring 505 in the back and forth directions, but is adapted to rotate due to the rotary movement of the diaphragm setting ring 505. Furthermore, a boss 504a of the manually movable diaphragm ring 504 is disposed to be engageable with the arm 503b of the diaphragm setting cam ring 503, so that when the characters EE engraved on the peripheral edge of the manually movable diaphragm ring 504 are set to be in alignment in such a condition as shown in the drawing with an indication sign marked on a lens barrel (not shown), a switch 535 hereinafter described is adapted to be interlocked with the manually movable diaphragm ring 504 to be shifted to "ON" position so as to be capable of controlling the quantity of light automatically, and any desired demension of the diaphragm aperture can be set by each of numerical values of the diaphragm to be coincident with the indication sign. And the diaphragm setting ring 505 is adapted to be actuated in the counterclockwise rotation due to the helical spring 505b and is also provided with the othher arm 505c which is arranged to extend at the opposite side to the aforementioned arm 505a. This oppositely extending arm 505c is held at the forward end thereof by a concave portion 508a of a preset lever 508. The diaphragm driving ring 506 is actuated in clockwise rotation due to a helical spring 506b and is provided with an arm 506c which is adapted to be in touch with an upright end portion 509a of a diaphragm closing lever 509. This diaphragm closing lever 509 is adapted to be actuated in the counterclockwise rotation due to a helical spring 509b and also to be actuated in the clockwise rotation by virtue of a diaphragm means (not shown) for the diaphragm closing lever which is caused through the second step action of a shutter button 528 of a camera. The foregoing preset lever 508 is provided with a toothed rack 508c and a guide slot 508b within which is inserted a guide pin 510a of a slidable plate 510. A pawl 510c rotatably fixed to the slidable plate 510 by a pin 510b is adapted to be engaged with the toothed rack 508c formed on the preset lever 508, thus the relative position of the slidable plate 510 and the preset lever 508 is variable corresponding to the sensitivity of a film. However, the slidable plate 510 and the preset lever 508 are adapted to be moved constantly together with each other. Moreover, the slidable plate 510 is provided with a toothed rack 510d with which a toothed wheel 511 is engaged. This toothed rack 511 is provided coaxially with a toothed wheel 511a which is adapted to be engaged through a toothed wheel 561 with the peripheral edge portion of a subsidiary diaphragm 562 disposed in front of a photoconductive element 520 hereinafter explained. Furthermore, the toothed wheel 511 is also engaged with an engaging surface 563a of a pointer scanning member 563. A boss 563b of the pointer scanning member 563 is adapted to be touched with a pin 528g of the shutter button 528 and a helical spring 563c is connected between the boss 563b and the shutter button 528, whereby the pointer scanning member 563 is adapted to be rotatable in a clockwise direction by the pressing-down action of the shutter button 528 and also is provided with an arm portion 563d which is disposed to be in touch with a pointer 512a of an exposure meter 512, thus the rotational motion of the pointer scanning member 563 is controlled by means of the pointer 512a of the exposure meter 512. The exposure meter 512 having such function as mentioned above is supplied with the output signal of a bridge circuit 515 through an amplifying circuit 514. The bridge circuit 515 is composed of a resistor 516, a resistor 517, a variable resistor 519 for setting a shutter speed and the photoconductive element 520. Further a diaphragm operating circuit 532 is consisted of the above mentioned bridge circuit 515, the foregoing amplifying circuit and the exposure meter 512. The input end of the bridge circuit 515 together with a shutter speed deciding circuit 521 are connected with DC power source 522. The reference numeral 523 designates a switch for supplying an electric current from the power source. The foregoing photo-conductive element 520 is arranged to receive thereupon an incident light which was transmitted through the diaphragm 502b left opened constantly and is refracted at a reflector 524 and passes in sequence through a Fresnel's lens 525 and a condenser lens 526 having a half mirror. This photo-conductive element 520 is connected with both of the bridge circuit 515 and the shutter speed deciding circuit 521 by means of a change-over switch 527. Now, FIG. 16 shows the arrangement of each of switches and other constitutional members which are disposed in an interlocking relationship to the shutter button shown in FIG. 15 wherein the shutter button 528 is provided with pins 528a, 528b, 528c and 528d. The first pin 528a is used for opening and closing of the foregoing switch 523, the second pin 528b effects to hold the lever 530 which was actuated to rotate in a counterclockwise direction due to a spring 529 so as to clamp the toothed wheel 511 or to release the toothed wheel 511 from clamping according to the condition of the lever whether it be touched on or detached from the pin 528b. Further, the third pin 528c serves for opening and closing of a switch 539, and the fourth pin 528d acts to change over a switch 545 respectively, thus an arm of the shutter button 528 is functional on a switching lever 531 which is effective for changing over the switch 527. Moreover, when the shutter button 528 is pressed downward, a driving mechanism (not shown) for a diaphragm closing lever is actuated and then shutter front screen starts running. This functional operation is carried out by the first step action of the shutter button 528 in such a manner that the switch 523 is turned to "ON" and the pointer scanning member 563 is rotated to clamp the toothed wheel, subsequently, the switch 527 is changed over to the side of the shutter time deciding circuit 521 to bring about the switch 539 to "OFF" state as well as to change over the switch 545 to the regeneration side b from the photometry side a, further according to the second step action of the shutter button 528, a mechanism (not shown) for driving a diaphragm closing lever is actuated so as to run the shutter front blades. Now, FIG. 17 illustrates in a concrete way the exposure control circuit shown in FIG. 15, and in the exposure operating circuit 532, the amplifying circuit 514 actuated by the output signal of the bridge circuit is constructed with transistors 533 and 534, thereby the foregoing exposure meter 512 and the switch 535 are connected in series between emitters of the above mentioned transistors 533 and 534. Moreover, in the circuit 521 for deciding shutter second, the reference numeral 536 represents a log-diode generating the voltage corresponding to the resistance value of the photo-conductive element 520 between terminals when the foregoing photo-conductive element 520 is cut over to the side of the shutter time deciding circuit 521 by means of the switch 527, and 537 designates a memory condensor which is charged corresponding to the voltage generated between terminals of the log-diode 536, 538 indicates a memory circuit for securing the voltage memorized in the memory condenser 537 after the switch 539 is shifted to "OFF" position. This memory circuit 538 is composed of the first and the second transistors 540 and 541 of the field-effect type. The reference numeral 542 is a transistor for stabilizing constant current of the memory circuit 538, 543 is a phase-reversing transistor, 544 is a regeneration circuit for applying an electric current corresponding to an electric current supplied to the log-diode 536 at the photometry by means of changing over the foregoing log-diode 536 to the regeneration side b due to changing over the switch 545. This regeneration circuit 544 comprises transistors 545 and 546. The reference numeral 547 is a shutter speed control condensor which is charged with regenerated current supplied from the regeneration circuit 544, and 548 represents a starting switch which is subjected to be turned to "OFF" upon start running of the shutter front blades, 549 denotes a Schmidt's circuit for making a magnet 550 to a non-excitation condition when charging voltage of the condensor 547 reaches to a pre-determined value, and the Schmidt's circuit 549 consists of transistors 551, 552 and 553.

Now, the functional operation of the mechanism mentioned above will be explained hereinafter. For the first place, the elucidation will be given in case of the shutter is preferential. At first, the relative position of the slidable plate 510 and the preset lever 508 is varied corresponding to ASA sensitivity of film. Then, the shutter dial 518 is set to be aligned with the desired time in speed so as to decide the resistance value of the variable resistance 519 and at the same time the characters EE engraved on the manually movable diaphragm ring 504 are arranged to coincide with the indication sign marked on a lens barrel which is not shown, thus the switch 535 is interlocked with the manually movable diaphragm ring 504 to be shifted to "ON" position. Then, upon the shutter button 528 being pressed downward, the switch 523 for supplying an electric current from the power source turns to "ON", so that the pointer 512a of the exposure meter 512 is actuated to swing by virtue of the output of the bridge circuit 512 and to stop at the position corresponding to the shutter second and the brightness. When the mandrel of the shutter button 528 is further pressed downward, a pointer clamping member (not shown) is adapted to clamp the pointer 512a, and afterwards, the pointer scanning member 563 is rotated in a clockwise direction by the helical spring 563c and is discontinued in its rotational motion at the position where the arm 563d comes in touch with the pointer 512a. Moreover, the rotational motion of the pointer scanning member 563 is transmitted to the slidable plate 510 through the toothed wheel 511 so as to displace the slidable plate 510 in downward direction, thereby the diaphragm setting ring 505 starts to rotate causing the rotary movement of the diaphragm setting cam ring 503. As the result of the above mentioned operation, the stroke of the cam surface area 503a is varied to admit the movement of the lever 507c to follow the above-mentioned rotary movement of the diaphragm setting cam ring 503, thus causing the rotation of the bell crank 507 as well as transference of the position of the pin 507b so as to decide the position of the bell crank 507 corresponding to the position where the pointer scanning member 563 is discontinued in its rotational motion. Furthermore, the rotational motion of the pointer scanning member 563 is transmitted to the subsidiary diaphragm 562 through the toothed wheels 511, 511a and 561, thus the opening aperture of the subsidiary diaphragm 562 is varied to a smaller diameter corresponding to the position where the pointer scanning member 563 is discontinued in its rotational motion. Subsequently, due to the displacement of the pin 528b of the shutter button 528, the toothed wheel 511 is clamped. Then, the switch 527 is changed over to the side of the shutter time deciding circuit 521 by virtue of the arm of the shutter button 528, thereby the photo-conductive element 520 is connected with the log-diode 536, thus the voltage $E_1$ corresponding to the resistance value of the photo-conductive element 520 is generated between terminals of the log-diode 536 by virtue of an electric current $I_1$ flowing through the photo-conductive element 520 and the log-diode 536. The memory condenser 537 is charged with the foregoing voltage $E_1$ and an electric pressure having the value of $E_1$ is generated between terminals of the memory condenser 537. This voltage $E_1$ is proportional logarithmically to the resistance value, that is, light amount received by the photo-conductive element 520. Then, the switch 539 is turned "OFF" due to the pin 528c and the terminal voltage $E_1$ of the condensor 537 is held on for memory. After this function, the switch 545 is changed over to the regeneration side. Therefore, the log-diode 536 is connected with the gate of the transistor 541 of the second field effect type provided in the memory circuit 538, so that an electric current $I_1$ is applied to the log-diode 536. The above mentioned electric current $I_2$ is adapted to be equivalent to an electric current $I_1$ applied to the log-diode 536 at the time of photometry by virtue of functions of the phase-reversing transistor 543 and the transistor 545 in the regeneration circuit 544. In such a manner as mentioned above, the terminal voltage $E_2$ of the log-diode 536 is brought about at the value indicated by the equation $E_2 = E_1$ to be equivalent to the voltage $E_1$ of the memory capacitor 537 generated at both end thereof. In such condition as mentioned hereinbefore, the electric current $I_2$ between the emitter and the collector of the transistor 545 provided in the regeneration circuit 544 is turned to be equivalent to the electric current $I_1$ which flows in the photo-conductive element 520 at the time of photometry. In other words, resistance value between the emitter and the collector of the transistor 545 is turned to be equivalent to the resistance of the photo-conductive element 520. And, the condensor 547 is charged by virtue of the resistance between the emitter and the collector of the transistor 546 which is set in functional equivalence to the foregoing transistor 545, thereby the shutter speed is decided by making use of the delayed time, thus when the shutter button 528 is further pressed downward, a mechanism for driving the diaphragm closing lever is actuated, and the diaphragm closing lever 509 is rotated in a clockwise direction while the diaphragm driving ring 506 is rotated in a counterclockwise direction. The rotary movement of the foregoing diaphragm driving ring 506 causes the retreat of the pin $506a_1$ to permit a counterclockwise rotation of the diaphragm closing ring 502 through the connecting rod 502e by the spring 502d, and a counterclockwise rotation mentioned above is discontinued at the position where the notched portion 502a comes to be in touch with the pin 507b, thereby the aperture of the diaphragm 502b left opened is brought about smaller in its diameter. In the next place, concurrently with the start for running of the shutter front screens, the starting switch 548 is turned to be "OFF", and charging to the condensor 547 is commenced. When the amount of the charging voltage to the condensor 547 reaches the action level of the Schmidt's circuit 549, the transistor 551 consisting the Schmidt's circuit 549 is turned to be "ON", while the transistor 552 is brought about to be "OFF". In this stage, the base potential of the transistor 553 is raised up and the transistor 553 is turned to "OFF", thereby an electric current applied to the magnet 550 for holding the shutter rear screens is discontinued, thus the shutter rear screens are closed, and preset exposure time as well as an appropriate exposure can be obtained. When the shutter button 528 is released from the press-down action, the switch 545 is changed over to the photometry side and the switch 539 is turned to "ON", then the switch 527 is changed over to the side of the diaphragm operating circuit 532, and the toothed wheel 511 as well as the pointer 512a are released from their clamping conditions, and the switch 523 is turned to "OFF". Furthermore, the diaphragm closing lever comes to the initial position after conclusion in running movement of the shutter rear screens and the diaphragm 502b is opened. Then, by winding a take-up shaft (not shown), the shutter charge and a film is taken up to be ready for the subsequent photographing.

In the aforementioned case, the elucidation was given when the object brightness was in normal condition. However, the following description will now be given in the case whether the object brightness is too large or too small. In case of the object brightness comes to excessively large or small and the pointer 512a of the exposure meter 512 is adapted to oscillate to the extent corresponding to the minimum or the maximum diaphragm, after the subsidiary diaphragm 562 is varied its opening to be smaller, the resistance value of the photoconductive element 520 comes to be smaller or larger comparing with the resistance value of the photo-conductive element 520 which corresponds to the resistance value of the presettled variable resistor 519. Accordingly, when the photo-conductive element 520 is cut over to the side of the shutter time deciding circuit 521 by means of the switch 527, the pre-settled exposure second is shifted and a correct exposure which is different from the pre-set exposure time can be obtained based on the resistance value of the photo-conductive element 520 upon which incident a beam of light passed through the minimum or the maximum subsidiary diaphragm 562, thus a fresh exposure second is decided.

The above description is given in such a case that the diaphragm is decided under the shutter preference, but the following explanation will be set forth in case of the diaphragm preference. In this instance, when the characters EE of the manually movable diaphragm ring 504 are disconnected from the indication sign of the lens barrel to set the desired diaphragm value, the switches 535 and 535' are turned to "OFF" respectively. Then, when the shutter button 528 is pressed downward, the exposure meter 512 is brought about in a non-actuation condition with the pointer thereof kept to be directed to the dark side since both switches 535 and 535' are turned to "OFF". Therefore, the pointer scanning member 563 is liable to move with maximum angle of rotation and the slidable plate 510 is also liable to displace downward to the maximum extent.

With the above mentioned maximum movement, the diaphragm setting ring 505 is subjected to rotate in a counterclockwise direction up to the position of the boss 504a serving as a stopper formed on the manually movable diaphragm ring 504 whereby the subsidiary diaphragm 562 is closed, varying its opening to be a smaller dimension according to the position of the aforementioned boss 504a, thus the diaphragm setting cam ring 503 is rotated corresponding to the set value of the manually movable diaphragm ring 504 so as to decide the position of the pin 507a of the bell crank 507. Further subsequent steps are carried out similar to the case of the shutter preference for set the shutter time by the rotational motion of the diaphragm ring 502 so as to make smaller the opening of the diaphragm 502b.

In the above mentioned case of the diaphragm preference, the position of the pointer 512a of the exposure meter 512 is disposed beyond the sphere of an interlocking movement of the pointer scanning member 563 so as to control the boundary of the rotational motion of the foregoing member 563 by means of the boss 504a provided on the manually movable diaphragm ring 504. However, with the structure to be formed in such a manner that the pointer 512a of the exposure meter 512 may be oscillatory according to the position of the manually movable diaphragm ring 504 so as to adjust the rotary movement of the pointer scanning member 563 for controlling the diaphragm value, indication by making use of the pointer 512a of the foregoing exposure meter 512 can easily be achieved.

The sixth embodiment of the present invention will be explained with reference to FIG. 18 to FIG. 20.

In FIG. 18, 601 denotes a diaphragm mechanism consisting of an iris ring 602, an iris setting cam ring 603, a manually operated iris ring 604, an iris setting ring 605, an iris drive ring 606, etc. arranged in series behind a lens 660, and this diaphragm mechanism 601 is composed as follows: namely, the iris ring 602 is provided with a notch 602a for mounting a bell crank 607 to be described later and with holes 602c with inserted, normally open iris sectors 602b both being perforated in it, and this iris ring 602, being forced by a spring 602d to rotate anticlockwise, effects said iris sectors 602b closed down by its anticlockwise rotation. The energy for rotating this iris ring 602 is accumulated by that connecting rod 602e planted on said iris ring 602 is checked by pin 606$a_1$ on a projection 606a of the iris drive ring 606, and on the periphery of the iris setting cam ring 603 are provided a cam surface 603a and an arm 603b. This cam surface 603a is in contact with a lever 607c planted on a bell crank 607 mounted at the notch 602a of said iris ring 602. This bell crank 607 rotates around a rotation axis 607a in correspondence with the stroke of the cam surface 603a, thus setting the position of the pin 607b and serving, through this position of the pin 607b, for regulation of rotation of said iris ring 602 in iris closure.

The arm 603b of the iris setting cam ring 603 is in engagement with arm 605a of the iris setting ring 605, and in this engagement the iris setting cam ring 603 can not be shifted by the back-and-forth motion of the iris setting ring 605, but the former is rotated by the rotation of the latter. Further manually operated iris ring 604 is capable of engaging with the arm 603b of said iris setting cam ring 603 by its projection 604a for stopper, and when the characters EE engraved on the periphery of said hand-operated iris ring are put in line with the mark on the lens borrel not shown in the drawing, an interlock switch 635, to be described later, can be put on in cooperation with this hand-operated iris ring 604, thus making automatic control of the diaphragm operation possible, while by putting each diaphragm setting number in line with the mark on the lens mount, said interlock switch 635 can be put off, thus making it possible to set any possible aperture. The iris setting ring 605 is forced by spring 605b to rotate in the anti-clockwise direction and at the same time is provided with another arm 605c against arm 605a. This second arm 605c is in engagement with the recess 610a of a sliding plate 610 guided by pins 610b and 610c.

The iris drive ring 606 is forced by spring 606b to rotate in the clockwise direction and is provided with an arm 606c. This arm 606c is in engagement with upright part 609a of the diaphragm setting lever 609, which is forced by a spring 609b to rotate in the anticlockwise direction, but it is also rotatable in the clockwise direction by the second stage movement of a release button 628 via a diaphragm setting lever drive mechanism not shown in the drawing. This sliding plate 610 has a rack 610d, which is in engagement with gear 611. This gear 611 is in engagement with the engaging part 663a of an indicator scanning member 663. A projection 663b of this indicator scanning member 663 is in engagement with the pin 628g of the release button 628 and has a spring 663c provided between itself and the release button 628. By this means the indicator scanning member 663 is made rotatable in the clockwise direction by pressing down the release button 628. Further this indicator scanning member 663 is provided with an arm 663d engageable with an indicator 612a of the exposure meter 612, thus making it possible to control the rotation of the indicator scanning member 663 by means of indicator 612a of the exposure meter 612. Such an exposure meter 612 is to be supplied with output signal from the bridge circuit 615 via an amplifying circuit 614. This bridge circuit 615 is composed of a resistance 616, a variable resistor 617 for setting ASA sensitivity in cooperation with a variable resistor 655 also for setting ASA sensitivity in a shutter time setting circuit 621, a variable resistor 619 for setting shutter speed controllable by a shutter dial and a photo-conductive element 620, while this bridge circuit 615, the amplifying circuit 614 and the exposure meter 612 compose an aperture calculation circuit 632.

The input terminal of this bridge circuit 615 is connected, together with shutter time deciding circuit 621, to a direct current source 622, and 623 denotes a switch for electric source. Onto said photo-conductive element 620 falls the light coming through normally open diaphragm 602b via a reflection mirror 624, a fresnel lens 625 and a condenser lens with half mirror. This photo-conductive element 620 is so arranged that it can be alternatively connected either to the bridge circuit 615 or to the shutter time setting circuit 621 by means of the switch 627.

Now FIG. 19 shows the arrangement of the release button and related switches, and on the shaft of release button 628 are provided pins 628a, 628b, 628c and 628d. The pin 628a is for operating said switch 623; the pin 628b is in engagement with the lever 630 forced to rotate in the anti-clockwise direction by the spring 629 and according to the state of engagement of this lever 630, said gear 611 is either clamped or released. Further the pin 628c is for operating the switch 639, and the pin 628d, for switching over of the swtich 645. The arm of the release button 628 acts on the lever 631 for switch over, and the switch 627 is switched over by the motion of the lever 631.

By pressing down the release button 628, the fore shutter curtain, also, can be run. These are so arranged that by the first step of motion of the release button 628, the switch 623 is put on and then, an indicator scanning member 663 being rotated, the gear 611 is clamped, and by the second step of motion of the release button 628, the diaphragm setting lever driving mechanism is actuated and thereafter the switch 627 is switched over onto the side of the shutter time setting circuit 621, the switch 639 is put off and the switch 645 is switched over onto regenerative side and the shutter front screen is run.

Now FIG. 20 shows concretely the exposure control circuit shown in FIG. 18, where the amplifying circuit 614, actuated by the output signal from the bridge circuit 615 in the diaphragm aperture measuring circuit 632, consists of transistors 633, 634; between the emitters of these transistors 633, 634 is connected said exposure meter 612. In the shutter time setting circuit 621, 636 denotes a log-diode which causes between terminals compressive tension corresponding to resistance value of the photo-conductive element 620 by switching over said photo-conductive element 620 onto the side of the shutter time setting circuit 621 by means of the switch 627, 637 denotes a memory condensor capable of being charged corresponding to tension between terminals of the log-diode 636, 638 denotes a memory circuit keeping tension stored in the memory condensor 637 by putting the switch 639 off and this memory circuit 638 is composed of a first and a second field-effect transistors 640, 641. 642 denotes a transistor for stabilizing constant current in the memory circuit 638; 643 denotes a transistor for phase conversion, 644 denotes a regenerative circuit which causes electric current, corresponding to the current flowing through the log-diode 636 when the light was measured, by switching over said log-diode 636 from the light measurement side a to the regenerative side b by means of the switch 645, which regenerative circuit 644 is composed of transistors 645, 646. 647 denotes a condensor for shutter speed control which can be charged by the regenerative current from the regenerative circuit 644, and 648 denotes a starting switch, which can be put off at the same time as the shutter front screen, not shown in the drawing, starts running and put on by signal indicating the end of shutter screen running, while 649 denotes a Schmidt circuit which puts a magnet 650 in non-excited state when charged voltage of the condensor 647 reaches the prescribed value and which is composed of transistors 651, 652 and 653.

Now the action of the above mentioned construction will be explained hereunder, starting with the case with shutter preference. At first, according to ASA sensitivity of film used, the resistance value of the interlock variable resistors 617, 655 for setting ASA sensitivity shall be decided, and the shutter dial 618 being set at the time in second as requested, the resistance value of the variable resistor 619 and at the same time the characters EE on the manually operted iris ring 604 shall be put in line with the mark on lens barrel not shown in the drawing. Then, in cooperation with manually operated iris ring 604, the interlock switch 635 shall be put on, and, when the release button 628 is pressed down, the switch for the electric source 625 shall be first of all put on, causing the indicator 612a of the exposure meter 612 start to move by output from the bridge circuit 615 and come to standstill at a point in correspondence to brightness. When the release button shaft 628 is pressed down further, the indicator scanning member 663 shall be rotated in the clockwise direction by the spring 663c, which rotation shall cease at a position where the arm 663a comes in engagement with the indicator 612a. Further this rotation of the indicator scanning member 663 shall be conveyed via the gear 611 to the sliding plate 610, making the latter move down, which causes rotation of the iris setting ring 605 and hence of the iris setting cam ring 603. Hereby the stroke of the cam surface 603a changes, which is followed by the lever 607c, making the bell crank 607 rotate and the position of the pin 607b being changed, the position of the bell crank 607 shall be decided in accordance with the standstill position of the indicator scanning member 663. Then, by the movement of the pin 628b of the release button 628, the gear 611 shall be clamped, and when the release button 628 is further pressed down, the diaphragm stop-down lever driving mechanism shall act and diaphragm stop-down lever 609 rotates in the clockwise direction, making the iris drive ring 606 rotate in the anit-clockwise direction. This rotation of the iris drive ring 606 causes retreat of the pin 606$a_1$, allowing, via the connecting rod 602e, rotation of the iris ring 602 by the spring 602d in the anticlockwise direction, which rotation comes to standstill when the notch 602a comes in contact with the pin 607b, and at the same time the iris sectors 602b are set. Then switch 627 is switched over by the arm of the release button 628 onto the side of the shutter time setting circuit 621. Hereby the photo-conductive element 620 is connected to the log-diode 636 so that by a current $I_1$ flowing through the photo-conductive element 620 and the log-diode 636, compressive tension $E_1$ is produced between terminals of the log-diode 636 corresponding to the resistance value of the photo-conductive element 620. By this tension $E_1$, the memory condensor 637 is charged, between the terminals of which a tension $E_1$ is produced.

This electric tension $E_1$ is in logarithmic relation with the resistance value of the photo-conductive element 620 i.e. light quantity received. Thereafter the switch 639 is put off by the pin 628c, keeping the terminal voltage $E_1$ of condensor 637 in memory, and then the switch 645 shall be switched over onto the regenerative side b. Hereby the log-diode 636 is connected to the gate of the second field-effect transistor 641 of the memory circuit 638 and the current $I_2$ flows to the log-diode 636. This current $I_2$ is so made that by the action of the transistor 643 for phase conversion and of the trnsistor 645 of the regenerative circuit 644, it becomes equal to the current $I_1$ flowing through the log-diode 636 at light measurement. Hereby the terminal voltage $E_2$ of the log-diode 636 becomes equal to the terminal voltage $E_1$ of the memory condensor 637, establishing $E_2 = E_1$. When this situation is established, the current $I_2$ between the emitter and the collector of the transistor 645 of the regenerative circuit 644 becomes equal to current $I_1$ flowing through the photo-conductive element 620 at light measurement. Namely the resistance value between the emitter and the collector of the transistor 645 becomes equal to the resistance value of the photo-conductive element 620 at light measurement. So, by means of the resistance between the emitter and the collector of the transistor 646, set to act similarly with this transistor, condensor 647 is charged and its delay time is used for setting shutter speed.

Next, at the same time with the start of movement of the shutter front screen, the starting switch 648 is put off and charging of the condensor 647 begins. When charged voltage of the condensor 647 reaches the acting level of the Schmidt circuit 649 of the components of same, the transistor 651 is put on and the transistor 652, put off. Then transistor 653, with its base voltage rising, is put off; current for the magnet 650 for holding the shutter rear screen is shut and the shutter rear screen is closed; by the signal of the end of the shutter rear screen running, the switch 648 shall be put on, thus giving the pre-set exposure time and also correct exposure.

When pressure on the release button 628 is set off, the switch 645 is switched over onto the side of light measurement a; the switch 639, put on; the switch 627, switched over onto the side of aperture measuring circuit 632, clamping of the gear 611, released; the switch 623, put off; and the indicator scanning member 663 rotates in the anti-clockwise direction so that the sliding plate 610 stops at the highest position in FIG. 18, rendering the iris sectors 602b in open state, and after ending of movement of shutter rear screen, the diaphragm stop-down lever 609 returns to its original position. And by winding up the winding axis not shown in the drawing, shutter charge and winding up of film is done, thus the next exposure is prepared.

In the above mentioned, it is explained for the cases with normal brightness of an object, and hereunder it will be explained cases with excess or shortage in object brightness. When object brightness is too high or too low and the exposure meter indicator 612a takes a position corresponding to the minimum aperture or to the maximum aperture, the resistance value of the photo-conductive element 620 is, after setting of the iris sectors 602b, lower or higher than the resistance value of the photo-conductive element 620 corresponding to the preset resistance value of the variable resistance 619. Accordingly, when the photo-conductive element 620 is switched over by the switch 627 onto the side of the shutter time setting circuit 621, the exposure time shall be shifted from the present one, and a new exposure time, giving correct exposure but different from the preset one, is set basing upon the resistance value of the photo-conductive element 620 on which the incident light through the minimum or maximum aperture 602b falls.

The above mentioned relates the case where the diaphragm is set with shutter preference, and now it will be explained on the case with diaphragm setting perference. In this case, the resistance value of the variable resistors 617, 655 for setting ASA sensitivity is decided. Here the resistance value of the variable resistor 617 has no relation in deciding of the exposure time hereafter. When characters EE on the manually operated ring are released from the mark on the lens barrel and the aperture value as requested is set, the indicator 612a of the exposure meter 612, since the switch 635 is off, is turned away upward in FIG. 18 where it is not in engagement with indicator scanning member 663. Accordingly the indicator scanning member 663 rotates to its maximum and the sliding plate 610 tends to go down to the maximum extend. Hereby the iris setting ring 605 rotates in the anti-clockwise direction upto the position of the projection 604a for stopper of the manually operated iris ring 604. Therefore the iris setting cam ring 603 rotates according to the set value of the manually operated iris ring 604 and decides the position of the pin 607b of the bell crank. Here the friction force of the manually operated iris ring 604 is made high and the manually operated iris ring 604 is not to be moved by the downward movement of the sliding plate 610. Further the procedure is carried out as in the case with shutter preference where the iris ring 602 rotates and, the setting iris sectors 602b, decides shutter time.

The seventh embodiment of the present invention shall be explained referring to FIG. 21 to FIG. 24.

FIG. 21 shows the general view of the device. 701 is an iris control mechanism comprising a diaphragm ring 702, an iris setting cam ring 703, a manual diaphragm ring 704, an iris setting ring 705, and a diaphragm driving ring 706 are in order arranged on the back of a picture taking lens 760. This iris control mechanism 701 is so constructed as undermentioned. That is, the diaphragm ring 702 is made with a notched part 702a for placing such a bell crank as undermentioned, and a hole 702c, fitted with a diaphragm 702b, having the habit of constant opening. The diaphragm ring 702 is actuated by a spring 702d to rotate unti-clockwise. Said diaphragm 702b is stopped down when the diaphragm ring 702 rotates anti-clockwise. The force to be given to this diaphragm ring 702 is accumulated by connecting a connecting rod 702e, planted on said diaphragm ring 702, with a pin 706a₁ of the projecting part 706a of the diaphragm driving ring 706. The rim of the iris setting cam ring 703 is provided with a cam face part 703a and an arm part 703b. Said cam face part 703a is contacted with a planted lever 707c of the bell crank 707, placed on the notched part 702a of the before-mentioned diaphragm ring 702. The bell crank 707 rotates corresponding to the stroke of the cam face part 703a around a rotating shaft 707a to set the position of a pin 707b. The position of the pin 707b controls the rotation for stopping down the before-mentioned diaphragm ring 702.

Further, the arm part 703b of the iris setting cam ring 703 is connected with the arm part 705a of the iris setting ring 705. In this relation of engagement, the iris setting cam ring 703 is not slided by the backward and forward sliding of the iris setting ring 705. But the iris setting cam ring 703 is rotated by the rotation of the iris setting ring 705. For the manual diaphragm ring 704, a projecting part 704a is made able to engage with the arm part 703b of the before-mentioned iris setting cam ring 703. When the character EE, cut on the rim of said manual diaphragm ring 704, is made to correspond to the index (not shown) of the lens tube (not shown), so that said manual diaphragm ring 704 is brought into the condition as shown in the drawing, the under-mentioned interlocking switches 735, 735' are on by interlocking said manual diaphragm ring 704. Thus, the light volume control can be automatically performed. And also, each iris value is adjusted to the index, so that a suitable diaphragm aperture can be set. The iris setting ring 705 is actuated by a spring 705b to rotate anti-clockwise and also, besides the before-mentioned arm part 705a on one side, is provided with an arm part 705c on the other side. This arm 705c on the other side is connected with the concave part 710a of a slider 710, guided by pins 710b, 710c. The diaphragm driving ring 706 is actuated by a spring 706b to rotate clockwise and has an arm part 706c. The arm part 706c is engaged with the halting part 709a of a stop-down lever 709. The stop-down lever 709 is actuated by a spring 709b to rotate anticlockwise, but is rotated clockwise through a stop-down lever driving mechanism (not shown) at the time of the second-stage action of the shutter button 728 of a camera. The slider 710 has a rack 710d, which is engaged with a gear 711. The gear 711 is engaged with a gear 712a, attached to the rotating shaft of a motor 712. When the motor 712 is started in motion, the slider 710 is moved by means of the gears 712a and 711. Said motor 712 is given through an amplifier circuit 714 with the output signal of a bridge circuit 715, serving as a comparator-detector circuit. Said bridge circuit 715 is composed of a variable resistor 716 for setting the sensitivity of a film; a variable resistor 717, variable by interlocking the motor 712 through said gears 712a and 711; a variable resistor 719, adjustable by a shutter dial 718 for setting the shutter speed, and a photo-conductive element 720. The bridge circuit 715, said amplifier circuit 714 and the servo motor 712 compose a diaphragm computer circuit 732. The input of said bridge circuit 715, together with a shutter time setting circuit 721, is connected with a direct current power source 721. 723 is a switch for making the power source. Light, transmitting the diaphragm 702b, having the habit of constant opening, passes in sequence through a reflecting mirror 724, a Fresnel lens 725 and a condensor lens 726, having a half mirror, and is made incident upon said photo-conductive element 720. The photo-conductive element 720 is changed over by a switch 727 to be connected with the bridge circuit 715 and the shutter time fixing circuit 721.

Now, FIG. 22 shows the condition of arrangement for the shutter button and the respective switches, having an interlocking relation therewith. The shaft of the shutter button 728 is provided with pins 728a, 728b, 728c and 728d. Said pin 728 is for turning on or off said switch 723. The pin 728b is engaged with the lever 730, actuated by a spring 729 to rotate anti-clockwise, so that the clamping and clamping release of said gear 711 is performed according to the condition of engagement with the lever 730. The pin 728c is for turning on or off a switch 739 and the pin 728d is to change over a switch 745. The arm of the shutter button 728 acts upon a switching lever 731. The switch 727 is changed over by the action of said lever 731. The shutter front blade is made to travel by the shutter button 728. Namely, the switch 723 is on by the first-stage action of the shutter button 728. And then, the gear 711 is clamped. The stop-down lever driving mechanism is actuated by the second-stage action of the shutter button 728. And then, the switch 727 is changed over to the side of the shutter time fixing circuit 721 and the switch 739 is off. The switch 745 is changed over to the regeneration side, whereby the shutter front blade begins to travel.

FIG. 23 shows concretely an exposure amount controlling circuit, shown in FIG. 21. In the iris computer circuit 732, the amplifier circuit 714, actuated by the output signal of the bridge circuit 715, consists of transistors 733, 734. Said motor 712 and the switch 735 are connected with the intermediate between the emitters of the transistors 733 and 734. A switch 735', interlocking the switch 735, is connected with the intermediate between both the collectors of the photo-conductive element 720 and the transistor 734. 736 is a log-diode, in which when said photo-conductive element 720 is changed over by the switch 727 to the side of the shutter time fixing circuit 721, a voltage is produced across the terminals corresponding to the resistance value of the photo-conductive element 720. 737 is a memory condensor to be charged corresponding to the voltage, produced across the terminals of the log-diode 736. 738 is a memory circuit, retaining the voltage which the memory condensor 732 stores when a switch 739 is off. Said memory circuit 738 is composed of the first and the second field-effect transistors 740, 741. 741 is a constant current stabilizing transistor for the memory circuit 738. 743 is a phase inverting transistor. 744 is a regeneration circuit, in which said log-diode 736 is changed over by a switch 745 to the regeneration side, a current is produced corresponding to the current, passing through the log-diode at the time of photometry. Said regeneration circuit 744 is composed of transistors 745, 746. 747 is a shutter speed control condensor to be charged with a current, regenerated by the regeneration circuit 744.

748 is a starting switch, which becomes off at the same time when the shutter front blade begins to travel. 749 is a Schmidt circuit, putting a magneto 750 into the non-excited condition when the charging voltage of the condenser 747 reaches the prescribed value. Said Schmidt circuit 749 is composed of transistors 751, 752, 753, a variable resistor 755 for setting the sensitivity of a film, and other resistors. Said variable resistor 755 for setting the sensitivity of a film interlocks the variable resistor 716 for setting the sensitivity of a film in the iris computer circuit 732.

The action of the above mentioned construction shall be explained as follows:

Referring first to the case of shutter preference, the variable resistors 716 and 755 are set corresponding to the ASA sensitivity of a film. The shutter dial 718 is adjusted to the desired time to determine the resistance value of the variable resistor 719, and also, the character EE of the manual diaphragm ring 704 is made to correspond to the index of the lens tube (not shown). Thus, interlocking the manual diaphragm ring 704, the switch 735 becomes on. When the shutter button 728 is pushed, the power source making switch 723 is on, so that the motor 712 is actuated by the output of the bridge circuit 715, whereby the slider 710 is moved. The iris setting cam ring 703 is rotated by the rotation of the iris setting ring 705, so that the stroke of the cam face part 703a changes. Following it, the lever 707a moves, so that the position of the pin 707a is moved by the rotation of the bell crank 707. Further, the second variable resistor 717 is varied by the rotation of the motor 712. According to the variation of the second variable resistor 717, the bridge circuit 715 is balanced. Then, the servo-motor 712 stops. By the stoppage of the servo-motor 712, the slider 710, the iris setting ring 705 and the iris setting cam ring 703 become unoperated and the movement of the bell crank 707 is stopped.

Then, by the movement of the pin 728b of the shutter button 728, the gear 711 is clamped and the servo-motor 712 becomes locked. When the shutter button 728 is further pushed, the stop-down lever driving mechanism is actuated. The stop-down lever 709 is rotated clockwise and makes the diaphragm driving ring 706 to rotate anticlockwise. This rotation of the diaphragm driving ring 706 moves the pin 706a₁ back and by means of the connecting rod 702e, allows the diaphragm ring 702 to be rotated anticlockwise by the spring 702d. When the notched part 702a is contacted to the pin 707b, the rotation is stopped and at the same time, the diaphragm 702b is stopped down. Then, the switch 727 is changed over by the arm of the shutter button 728 to the side of the shutter time fixing circuit 721, whereby the photo-conductive element 720, receiving light through the picture taking lens 760 when the diaphragm 702b is in the stopped down condition, is connected with the log-diode 736, so that the voltage $E_1$, corresponding to the resistance valve of the photo-conductive element 720 is produced across the terminals of the log-diode 736 by the current $I_1$, passing through the photo-conductive element 720 and the log-diode 736. The memory condensor 737 is charged at this voltage and a voltage of $E_1$ is produced across the terminals. The voltage $E_1$ is logarithmically proportional to the resistance value, namely the light amount to be received by the photo-conductive element 720. Then, the switch 739 is made off by the pin 728c and the terminal voltage $E_1$ of the condensor 737 is memorized and stored. After this, the switch 745 is changed over to the regeneration side, whereby the log-diode 736 is connected with the gate of the second field-effect transistor 741 in the memory circuit 738. The current $I_2$ is passed through the log-diode 736. This current $I_2$ is made by the action of the phase inverting transistor 743 and the transistor 745 of the regeneration circuit 744 to be equal to the current $I_1$, passed through the log-diode 738 at the time of photometry. Consequently, the terminal voltage $E_2$ of the log-diode 738 becomes $E_2 = E_1$ and equal to the voltage $E_1$ of both terminals of the memory condensor 737. Thus, the current $I_2$ across the emitter and the collector of the transistor 745 in the regeneration circuit 744 becomes equal to the current $I_1$, flowing through the photo-conductive element 720 at the time of photometry. That is, the resistance value between the emitter and collector of the transistor 745 becomes equal to the resistance value of the photo-conductive element, resulting at the time of photometry. Against the resistance between the emitter and the collector of the transistor 746, set so as to take the same action as that of the transistor 745, the condensor 747 is charged and the shutter speed is set with use of the delay time. Accordingly, at the same time when the shutter front screen begins to travel, the starting switch 748 is off and the charge of the condensor 747 begins. When the charging voltage of the condensor 747 reaches the action level of the Schmidt circuit 749, the transistor 751 is on and the transistor 752 is off in the Schmidt circuit 749. Thus, the base potential is increased and the transistor 753 is off. The magneto 750 for holding the rear blade is off and the rear blade is closed, so that the proper exposure can be performed in the previously set exposure time.

When the shutter buttom 728 is released from the push, the switch 745 is changed over to the side of photometry. The switch 739 is on and the switch 720 is changed over to the side of the iris computer circuit 732. The clamp of the gear 711 is released and the switch 723 is off. And also, after the travel of the shutter rear blade is finished, the stop-down lever 709 is returned and the diaphragm 702b is made open. When the spool shaft (not shown) is wound up, the shutter charge and the spooling of a film are carried out. The subsequent photographing is ready.

The above mentioned case is explained in relation to the ordinary brightness of the object to be photographed. The case of the object to be photographed with a too much or too little brightness shall be explained. When the brightness of the object to be photographed is large, the bridge circuit does not become balanced even though the second variable resistor 717 reaches the minimum value of resistance. That is, even if the iris setting ring 705 is so set that the lens is stopped down to the minimum, the bridge circuit 715 is not balanced. At this time, the resistance value of the photo-conductive element 720 is too little as compared with the pre-set resistance value of the first variable resistor 719. Accordingly, if the photo-conductive element 720 is changed over by the switch 727 to the side of the shutter time setting circuit 721, the proper exposure can be performed according to the exposure time, shifted so as to be shorter than the pre-set exposure time. When the brightness of the object to be photographed is little, the bridge circuit 715 is not balanced even if the second variable resistor 717 reaches the maximum value of resistance. That is, the bridge circuit 715 is not balanced even if the iris setting ring 705 is so set that the lens is stopped down to the maximum. At this time, the resistance value of the photo-conductive element 720 is too large as compared with the pre-set resistance value of the first variable resistor 719. Accordingly, when the photo-conductive element 720 is changed over by the switch 727 to the side of the shutter time computer circuit 721, the proper exposure can be performed according to the exposure time, shifted so as to be longer than the pre-set exposure time.

The above description concerns the determination of iris in case of shutter preference. Now, the case of iris preference shall be explained. In this case, when the character EE of the manual diaphragm ring 704 is removed from the index of the lens tube, the switches 735 735' are off. Therefore, because the slider 710 moves following the projecting part 704a of the manual diaphragm ring 704, if the manual diaphragm 704 is set to the desired value, the iris setting ring 705 is rotated corresponding to this and the position of the iris setting cam ring 703 is fixed.

Then, if the shutter button 728 is pushed, the diaphragm ring 702 is rotated similarly to the case of shutter preference, and the diaphragm 702b is stopped down. Then, as the diaphragm 702b remains in the stopped down condition, the shutter time is determined according to the photo-conductive element, receiving light from the picture taking lens.

In the above example, there is explained the case that the servo-motor 712 is used. However, the present invention is not limited to this. As shown in FIG. 24, it can be similarly embodied by replacing the motor with for example a meter 7160. That is, the second variable resistor 717 is actuated by one end part of the indicator 7160a of the meter 7160. The meter 7160 is stopped at the point that the bridge circuit 715 is balanced. Therefore, the angle of swing of a saw tooth ring 7161 is controlled by the other end part of the indicator 7160b similarly to the case of an EE camera, so that the slider 710 is controlled by means of the gear 711 similarly to the before-mentioned.

Further, according to the present invention, a level detector circuit may be used instead of such a servo circuit as shown in the above mentioned, in order to perform exposure control.

And besides, in the above mentioned example, there is shown an electronic shutter circuit, having a memory device. However, the inventive device can be applied to an electronic shutter, having no memory device. If for example a photosensitive element for light, reflected on a film face, is provided for photometry, it is not necessary to use a memory device.

What is claimed is:

1. An exposure control system for a single lens reflex camera having a shutter release operation and an objective lens, comprising:
    a diaphragm device having an adjustable aperture;
    means for adjusting the diaphragm aperture of said diaphragm device, said aperture adjusting means starting its action with initiation of shutter release operation of said camera;
    an exposure control device including:
        a photosensitive element for sensing the light passed through the objective lens and diaphragm device at the maximum diaphragm aperture, said element for converting the light passing through the objective lens into an electric signal,
        means for memorizing the electric signal provided by said photosensitive element, and
        means for regenerating the electric signal memorized in said memory means;
    a shutter speed setting means capable of being selectively adjusted manually for setting shutter speed;
    means responsive to said regeneration means for setting a first level, said level setting means being set to the value corresponding to the adjusted value of said shutter speed setting means;
    means for setting a second level, said means being set to a value corresponding to the adjusted amount of said aperture adjusting means;
    means for finally determining the diaphragm aperture, said means including means for comparing the output level of said first level setting means with that of said second level setting means;
    means responsive to said comparison means for locking said aperture adjusting means after being finally determined by said final determining means;
    shutter control means responsive to said regenerative means; and
    means for changing the connection of the regenerative means to the shutter control means from the first level setting means in association with the action of said locking means.

2. An exposure control system as in claim 1, wherein said shutter control means incorporates the comparison means of said diaphragm determining means.

3. An exposure control system as in claim 1, wherein said diaphragm device is provided with a diaphragm pre-set means which is adjusted by said adjusting means.

4. An exposure control system as in claim 1, wherein the first level setting means is provided with a variable resistance which is set to a value corresponding to the set value of the shutter speed setting means, said level setting means being coupled to said regeneration means.

5. An exposure control system as in claim 1, wherein the second level setting means is provided with a resistance as well as a variable resistance connected in series with said resistance, said variable resistance to be set to the value corresponding to the adjusted amount of said aperture adjusting means.

6. An exposure control device as in claim 1, wherein the locking means is provided with an electro-magnet as well as an engaging member for inactivating the aperture adjusting means under the influence of action caused by said electromagnet.

7. An exposure control system for a single lens reflex camera comprising:
    a diaphragm device having an adjustable aperture;
    means for adjusting the diaphragm aperture of said diaphragm device, said means starting its action with initiation of shutter release operation of said camera;
    an exposure control device, including:
        a photosensitive element for sensing the light passed through an objective lens at a fully opened diaphragm aperture, said element for converting the light passed through the objective lens to an electric signal;
        means for memorizing the electrical signal of said photosensitive element; and
        means for regenerating the electrical signal memorized in said memory means;
    a subsidiary diaphragm arranged in front of said photosensitive element to be variable in its aperture opening corresponding to the adjusted amount of said adjusting means;
    a shutter speed setting means capable of being selectively adjusted by manual operation;

means containing said regenerative means for setting a first level, said level setting means adapted to be set to a value corresponding to the adjusted value of said shutter speed setting means;

means for setting a second level, said means being set to a value corresponding to photographing light conditions;

a diaphragm deciding means, said means being provided with a means for comparing the output level of said first level setting means with that of said second level setting means;

means for locking said adjusting means responsive to the output of said comparison means;

a shutter control means responsive to said regenerative means; and means for changing the connection of the regenerative means to the shutter control means from the first level setting means in association with the action of said locking means.

* * * * *